US007139406B2

(12) United States Patent
McClelland et al.

(10) Patent No.: US 7,139,406 B2
(45) Date of Patent: Nov. 21, 2006

(54) REMOTE BAGGAGE SCREENING SYSTEM, SOFTWARE AND METHOD

(75) Inventors: Keith M. McClelland, Needham, MA (US); Craig Dawson, Shirley, MA (US); Ying Huang, Lexington, MA (US); Andrea L. Whitson, Jamaica Plain, MA (US)

(73) Assignee: L-3 Communications Security and Detection Systems, Woburn, MA (US)

( * ) Notice: Subject to any disclaimer, the term of this patent is extended or adjusted under 35 U.S.C. 154(b) by 492 days.

(21) Appl. No.: 10/116,693

(22) Filed: Apr. 3, 2002

(65) Prior Publication Data

US 2002/0186862 A1 Dec. 12, 2002

Related U.S. Application Data

(60) Provisional application No. 60/281,068, filed on Apr. 3, 2001.

(51) Int. Cl.
*G06K 17/00* (2006.01)
*G01N 9/00* (2006.01)
*G01T 1/38* (2006.01)

(52) U.S. Cl. .................. 382/100; 705/5; 340/600; 378/57

(58) Field of Classification Search ............... 382/100; 378/57
See application file for complete search history.

(56) References Cited

U.S. PATENT DOCUMENTS

| 4,020,346 A | 4/1977 | Dennis |
| 4,064,440 A | 12/1977 | Roder |
| 4,217,641 A | 8/1980 | Naparstek |
| 4,247,774 A | 1/1981 | Brooks |
| 4,539,648 A | 9/1985 | Schatzki |
| 4,580,219 A | 4/1986 | Pele et al. |
| 4,590,558 A | 5/1986 | Glover et al. |
| 4,709,333 A | 11/1987 | Crawford |
| 4,759,047 A | 7/1988 | Donges et al. |
| 4,788,704 A | 11/1988 | Donges et al. |
| 4,941,162 A | 7/1990 | Vartsky et al. |
| 4,957,250 A | 9/1990 | Hararat-Tehrani |
| 5,070,519 A | 12/1991 | Stein et al. |
| 5,109,691 A | 5/1992 | Corrigan et al. |
| 5,125,015 A | 6/1992 | Shimoni et al. |
| 5,162,652 A | 11/1992 | Cohen et al. |
| 5,182,764 A | 1/1993 | Peschmann et al. |
| 5,243,664 A | 9/1993 | Tuy |
| 5,299,116 A * | 3/1994 | Owens et al. .................. 705/28 |

(Continued)

FOREIGN PATENT DOCUMENTS

WO WO02/082290 A1 10/2002

OTHER PUBLICATIONS

I.D. Jupp et al, "The Non-Invasive Inspection of Baggage Using Coherent X-ray Scattering," IEEE Transactions on Nuclear Science, vol. 47, No. 6, Dec. 2000, pp. 1987-1994.

(Continued)

*Primary Examiner*—Brian Werner
(74) *Attorney, Agent, or Firm*—Wolf, Greenfield & Sacks, P.C.

(57) ABSTRACT

A method of advance baggage screening includes steps of transmitting a threat file corresponding to an item under inspection to a processing center, analyzing the threat file according to a detection algorithm at the processing center to determine a screening result for the item under inspection, and transmitting the screening result to a remotely located operator interface for access by an operator.

16 Claims, 20 Drawing Sheets

U.S. PATENT DOCUMENTS

| | | |
|---|---|---|
| 5,319,547 A | 6/1994 | Krug et al. |
| 5,323,004 A | 6/1994 | Ettinger et al. |
| 5,367,552 A * | 11/1994 | Peschmann .................. 378/57 |
| 5,490,218 A | 2/1996 | Krug et al. |
| 5,600,303 A | 2/1997 | Husseiny et al. |
| 5,600,700 A | 2/1997 | Krug et al. |
| 5,642,393 A | 6/1997 | Krug et al. |
| 5,805,660 A | 9/1998 | Perion et al. |
| 5,838,758 A | 11/1998 | Krug et al. |
| 5,909,478 A | 6/1999 | Polichar et al. |
| 5,933,471 A | 8/1999 | Kalvin |
| 5,974,111 A | 10/1999 | Krug et al. |
| 6,014,451 A * | 1/2000 | Berry et al. ................. 382/110 |
| 6,014,628 A | 1/2000 | Kovarik, Jr. |
| 6,018,562 A | 1/2000 | Willson |
| 6,076,400 A | 6/2000 | Bechwati et al. |
| 6,088,423 A | 7/2000 | Krug et al. |
| 6,094,472 A | 7/2000 | Smith |
| 6,118,850 A | 9/2000 | Mayo et al. |
| 6,163,591 A | 12/2000 | Benjamin |
| 6,198,795 B1 | 3/2001 | Naumann et al. |
| 6,218,943 B1 * | 4/2001 | Ellenbogen .............. 340/572.4 |
| 6,272,230 B1 | 8/2001 | Hiraoglu et al. |
| 6,345,113 B1 | 2/2002 | Crawford et al. |
| 6,370,222 B1 | 4/2002 | Cornick, Jr. |
| 6,707,879 B1 | 3/2004 | McClelland et al. |
| 6,721,391 B1 | 4/2004 | McClelland et al. |
| 6,754,196 B1 * | 6/2004 | Daane et al. ............... 370/338 |
| 2003/0085163 A1 | 5/2003 | Chan et al. |
| 2004/0101098 A1 | 5/2004 | Bijjani et al. |
| 2005/0008119 A1 | 1/2005 | McClelland et al. |
| 2005/0031076 A1 | 2/2005 | McClelland et al. |

OTHER PUBLICATIONS

Michael J. Barrientos, "Screener Threat Detection Performance With Three Dimensional X-ray Imaging," International Carnahan Conference on Security Technology, 2000, Proc. IEEE 34th Annual 2000, pp. 178-191.

S.P. Beevor et al., "Non-Invasive Inspection Of Baggage Using Coherent X-ray Scattering," European Convention On Security and Detection, 1995.

Roder, Fredrick L., "Explosives Detection By Dual-Energy Computed Tomography," Proc. SPIE, Apr. 19-20, 1979, pp. 171-178.

Office of Technology Assessment, Congressional Board of the 102d Congress, publicly released Feb. 26, 1991, entitled "Technology Against Terrorism, The Federal Effort".

"Multi-View Tomography, Model MVT" Brochure, Vivid Technologies, Inc., MVT0699, Rev. 1 (Release date Oct. 1997).

"Vivid VIS108" Brochure, L-3 Communications Security and Detection Systems, Rev. Sep. 2002.

* cited by examiner

REMOTE BAGGAGE SCREENING SYSTEM, SOFTWARE AND METHOD

CROSS-REFERENCE TO RELATED APPLICATIONS

This application claims priority under 35 U.S.C. §119(e) to commonly-owned, co-pending U.S. Provisional application Ser. No. 60/281,068, entitled "Remote Access Server," filed on Apr. 3, 2001 (not published).

BACKGROUND

1. Field of the Invention

The present invention relates to a method and system for screening items of baggage or packages which may be used, for example, in airports.

2. Discussion of Related Art

Particularly at airports, it is often necessary or desirable to screen passenger baggage for potential threats or contraband items. In light of recent terrorist activities, it is becoming more important to accurately screen baggage. However, with increasing air traffic, it is also becoming more necessary to expedite the screening procedure to avoid long delays. Conventional systems for passenger baggage screening at airports use separate departure screening, for explosives, weapons, etc., and arrival screening for contraband items such as currency or drugs on international flights. Therefore, conventional systems require at least two baggage screening systems—one at a passenger's point of origin, a second at the passenger's destination, and possibly additional systems at any intermediary stops between the passenger's point of origin and his/her destination.

Such baggage inspection systems include X-ray imaging systems, which may employ transmitted and/or scattered X-ray radiation, vapor detection systems, magnetic resonance imaging systems, and other types of inspection systems. The X-ray imaging systems incorporate an X-ray single or dual energy source and a scanning system to scan the object to be inspected with and X-ray beam produced by the source. Some systems use a single-view source and detector arrangement, while others utilize a dual-view or multi-view arrangement. The single-view or dual-view systems usually scan baggage as it moves on a conveyor, using a fan beam or scanning pencil beam of X-rays to provide projection images. The multi-view, CT-type systems generally scan stationary baggage and process data corresponding to absorption of X-rays to reconstruct a cross-sectional view of the contents of the baggage. Conventional systems include a processing device which may optionally digitally manipulate the image generated by the detector arrangement, and a display system which presents the image for inspection by an operator, who then decides whether contraband is located in the baggage based on the shape and location of the imaged items. Generally, in conventional systems, analysis of the image by the operator is done at the same physical location as where the inspection system is located.

UN/EDIFACT (United Nations Rules for Electronic Data Interchange for Administration, Commerce and Transport) is a set of internationally agreed to standards, directories and guidelines for the electronic exchange of structured data and, in particular, electronic exchanges related to trade in goods and services between independent computerized information systems. The UN/EDIFACT system is the standard for communications in the air transport industry, and is the language by which airlines and airports communicate their reservations, scheduling, and passenger and baggage information. A system known as Advance Passenger Information (API) is a system that utilizes UN/EDIFACT data to transmit and process passenger manifests. Passengers whose data matches a "threat profile" may be separated for second-tier customs screening at destination airports. In the API system, passenger identification may be sent to customs authorities at a destination airport while aircraft is in flight. The passenger identification data can be compared to computer databases containing profiles before the passengers arrive. Although this system expedites the customs procedure by second-tier screening only passengers who match the high risk profile model, the system relies on profiling individuals, and therefore suffers from several drawbacks. For example, much of security profiling is based on the racial or ethnic origin of the passenger, leading to claims of racial discrimination and unlawful search and seizure. Another problem with the system is that it does not screen all passengers, but only those that match the high risk profile model, resulting in an at least partially ineffective system which may miss some baggage that includes illegal contraband.

SUMMARY OF THE INVENTION

According to one embodiment, a method of advance baggage screening may comprise steps of transmitting a threat file corresponding to an item under inspection to a processing center, analyzing the threat file according to a detection algorithm at the processing center to determine a screening result for the item under inspection, and transmitting the screening result to an operator interface for access by an operator.

According to another embodiment, a method of remote baggage screening may comprise steps of examining an item under inspection at a first location, storing information about an item under inspection obtained during the examining step, and linking a unique item identifier to the information to uniquely associate the information with the item under inspection. The method may also include steps of transmitting the information to a second location responsive to a request for the information, analyzing the information according to a detection algorithm to produce threat information, and determining a screening result for the item under inspection based on the threat information.

According to yet another embodiment, a method of advance baggage screening comprises steps of obtaining information about an item of baggage at a first point of inspection of the item of baggage, storing the information in a database, remotely accessing the information from a location other than the first point of inspection of the item of baggage, and analyzing the information to determine a screening result for the item of baggage. In one example, the step of obtaining information about the item of baggage may include performing an X-ray inspection of the item of baggage, and obtaining an image file that includes data corresponding to the X-ray image of the item of baggage and a unique item ID that uniquely identifies the item of baggage associated with the image file.

BRIEF DESCRIPTION OF THE DRAWINGS

The foregoing and other features and advantages of the present invention will be apparent from the following non-limiting discussion of various embodiments and aspects thereof with reference to the accompanying drawings, in which like reference numerals refer to like elements throughout the different figures. In the drawings.

DETAILED DESCRIPTION

The present invention is directed toward a system and methods for screening items, for example, baggage or packages, particularly from a remote location. The system includes transmission of scanned information about items under inspection from a first location where the scanning occurs, to a second location that may be remote from the first location. Operators may access the information from the second location, or from yet another location, over, for example, a secure network or Internet link. In one example, the system may include one or more inspection machines that inspect item and obtain information about the items, and a server, located remote from the inspection machines, that has access to the information and to the machines. The machines may be any type of now known or later developed inspection machines. The information may also include, or be linked to, information regarding passengers to whom the items belong, a point of origin of the items, or other information.

Figure 1:
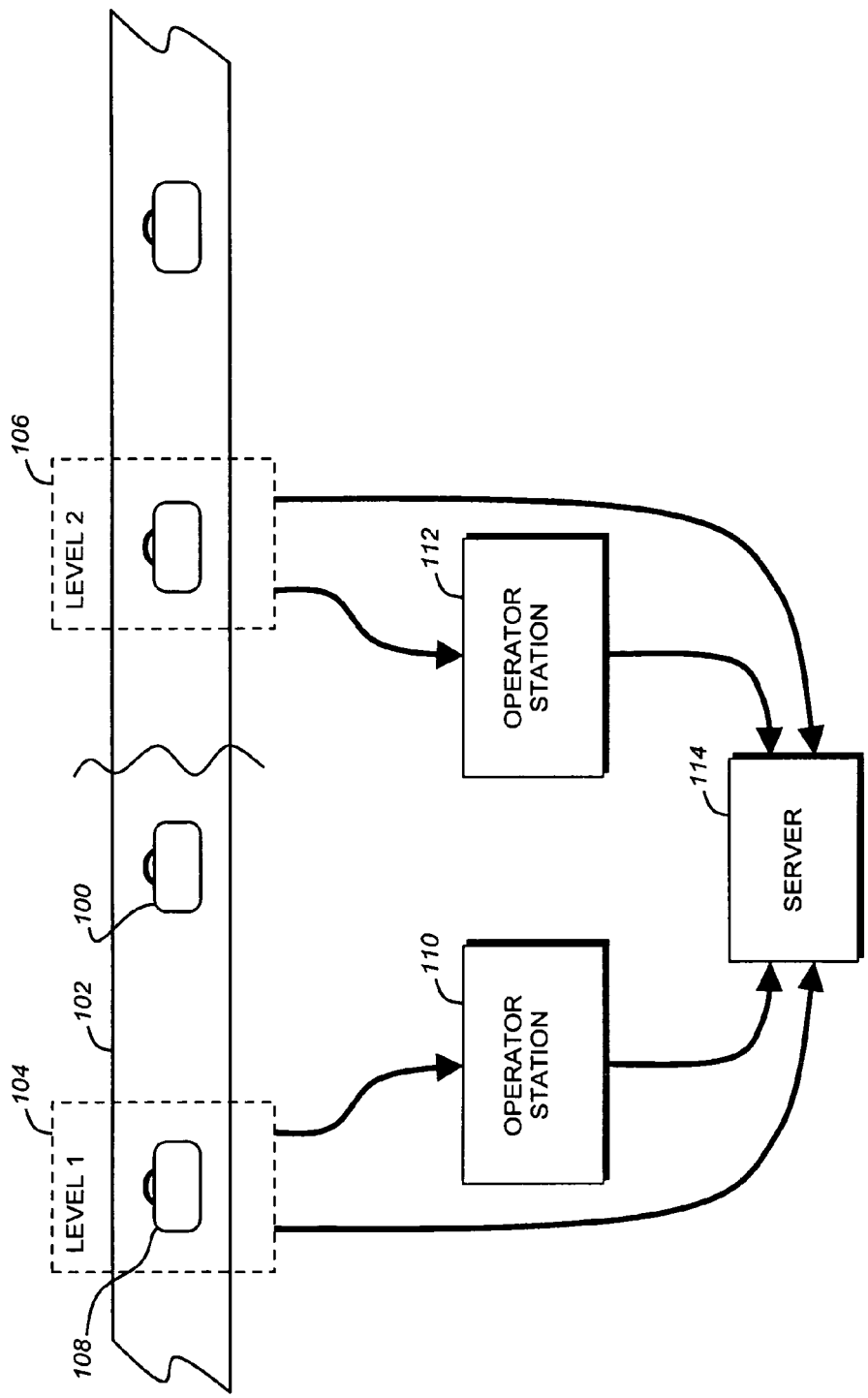
FIG. 1 is a schematic block diagram of an exemplary baggage inspection system.

Referring to FIG. 1, there is illustrated one exemplary embodiment of a baggage inspection system according to the present invention. It is to be appreciated that although the following discussion will refer in particular to baggage inspection systems located at airports, the invention is not so limited, and may be equally applied to baggage screening at, for example, bus depots or train terminals, or to screening of packages at, for example, post offices or other mail centers. According to one example, items of baggage 100 may be transported along a conveyor 102 and may be examined by one or more baggage inspection machines 104, 106. According to the illustrated embodiment, the system includes two levels of screening: a level one inspection machine 104 and a level two inspection machine 106. Items of baggage 100 that are not cleared by the level one inspection machine 104 may be transported to the level two inspection machine 106 for further examination. It is to be appreciated that the system is not limited to two levels of screening, as shown, but may include only one level of screening, or more than two levels of screening, as desired.

According to one embodiment, an item under inspection 108 may be examined by an inspection machine 104 to determine information about the item under inspection 108, such as, for example, whether the item under inspection 108 potentially contains contraband or hazardous substances. If a region of interest is detected within the item under inspection 108, the item may be sent for further examination by an inspection machine 106. The inspection machine 106 may perform a more detailed examination of the item under inspection 108, and in one example, may focus its examination on the region of interest identified by inspection machine 104. According to one example, the inspection machines 104, 106 may be X-ray inspection machines that may obtain an X-ray image of the item under inspection 108 by detecting X-ray radiation either transmitted through or scattered from the item under inspection 108. It is to be appreciated that although throughout the following discussion, the inspection machines 104, 106 will be referred to as X-ray inspection machines, the invention is not so limited, and these machines may be any type of baggage inspection machines including, for example, vapor detection machines, magnetic resonance imaging (MRI) scanners, CT scanners, or another type of inspection machine.

As illustrated in FIG. 1, the inspection machines 104, 106 may be coupled to operator stations 110, 112, respectively. The operator stations 110, 112 may include a processing device that may digitally process the data received from the inspection machines 104, 106, and may also include a display to present the information, for example an X-ray image of the item under inspection 108, to an operator. The operator may then examine the image and make a decision as to whether or not to clear the item under inspection 108. It is to be appreciated that although the illustrated embodiment includes two operator stations, one coupled to each inspection machine 104, 106 respectively, the system is not so limited, and, for example, may include a single operator station coupled to both inspection machines. It is further to be appreciated that while operator station 110 will be discussed in more detail below, the discussion will apply equally and interchangeably to operator station 112.

The inspection machines 104, 106 may further be coupled to a server 114. The server may include a storage unit that stores information, such as the X-ray images of items under inspection 108, in a database for access by, for example, an operator station 112. The server 114 may also include a processing device that may digitally process the data received from the inspection machines 104, 106. The server 114 and its operation will be discussed in more detail below.

According to one embodiment, a local network of baggage screening machines including, for example, inspection machines 104, 106, may be provided at a certain location, for example, an airport. The local network of inspection machines may include a plurality of machines located at various terminals throughout the airport. The plurality of inspection machines may be coupled to a remote access server, such as server 114, thereby forming the local network. A remote operator station may be coupled to the local network of inspection machines via the remote access server.

Neither the remote operator station nor the remote access server need be located at the same location (e.g. the same airport) as the local network of machines, because the remote access server, the remote operator station and the local network of machines may be coupled to one another using a secure Internet or other long-distance network connection and protocol, as will be discussed in more detail below.

Figure 2:
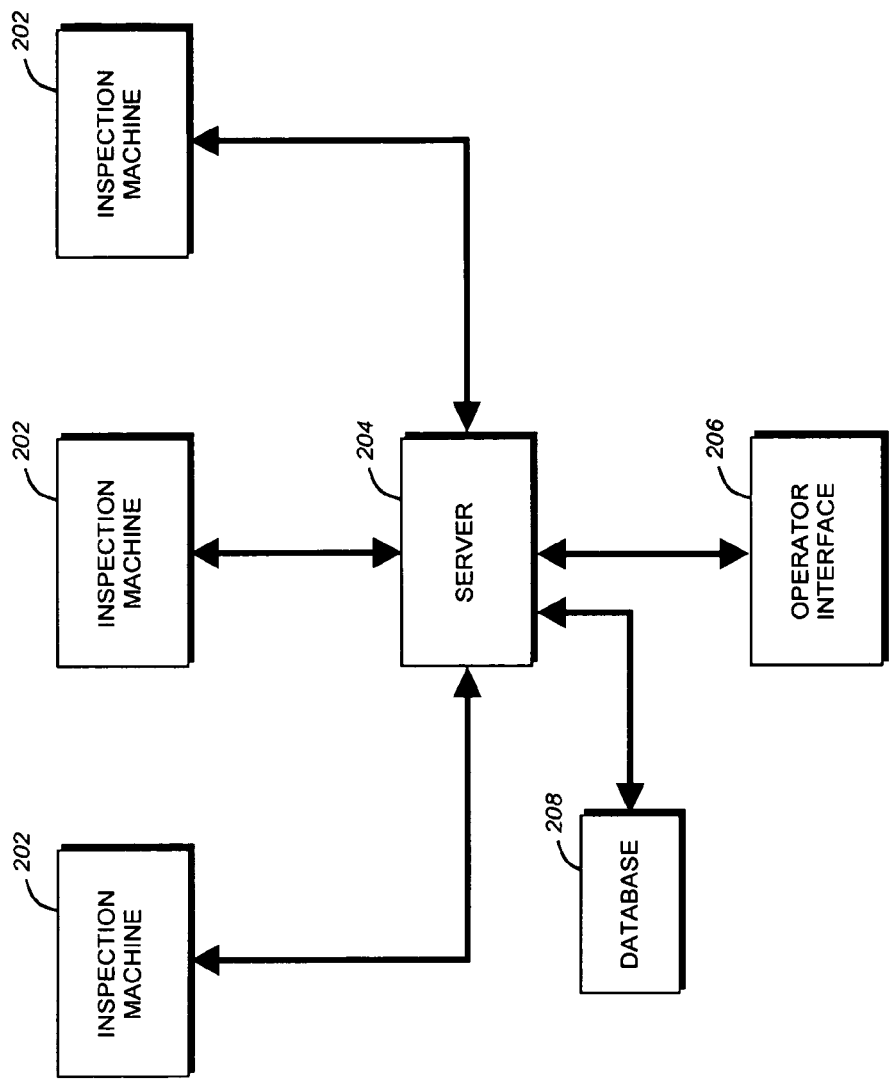
FIG. 2 is a schematic block diagram of an exemplary local network of inspection machines including a remote access bridge, according to the present invention.

According to one embodiment, the remote access server may include a remote access bridge which may operate on a computing machine connected to the local network of baggage inspection machines. Through the remote access bridge, an authorized operator located on the premises of the local network of baggage screening machines may view and change the status of any machine connected to the network. The operator may also view statistical data related to all the inspection machines connected in the local network. Referring to FIG. 2, there is illustrated an exemplary local network 200 including a plurality of inspection machines 202, a remote access bridge 204 coupled to the plurality of inspection machines 202, and an operator interface 206 coupled to the remote access bridge 204. Through the remote access bridge 204, an operator using the operator interface 206 may view information relating to each of the individual inspection machines 202, and to the entire network 200. The remote access bridge may further include a database 208 that stores the information. In one example, the local network of inspection machines, the database and the remote access bridge may all be connected on a common subnet, which is a portion of a network that shares a common address component. For example, on TCP/IP networks, such as the Internet, subnets are defined as all devices whose IP addresses have the same prefix. For example, all devices with IP address that begin with 100.100.100 would be part of the same subnet. Thus, an operator connected on the same subnet as the remote access bridge and the local network of inspection machines may have access to the machines and data on the subnet, as discussed above. According to another example, an operator on a different subnet may access, via the remote access bridge, statistical data relating to the inspection machines connected on the local network.

According to one example, the remote access bridge 204 may be based upon a multi-threaded application, with one thread handling all operator interface issues, and the other thread managing the connection to the network of baggage screening machines. Both threads may use various synchronization methods to read from and write to and from a common database. The database may be a central source of information regarding status of the local network and the individual baggage screening machines 202, and information received by the baggage screening machines about item under inspection (108, FIG. 1). Each baggage screening machine 202 connected to the local network may include a unique IP address, or other identifier, that allows the remote access bridge 204 to know what type of machine it is, and what the status of the machine is, i.e., active, inactive, or in a fault condition. In one example, the operator interface 206, connected on the first subnet with the inspection machines, may include a display including icons representing each of the baggage screening machines 202 included in the local network. The information shown in the display on the operator interface 206 may be controlled and updated by software running on the remote access bridge 206, and also by instructions from an operator using the operator interface 206.

Figure 3:
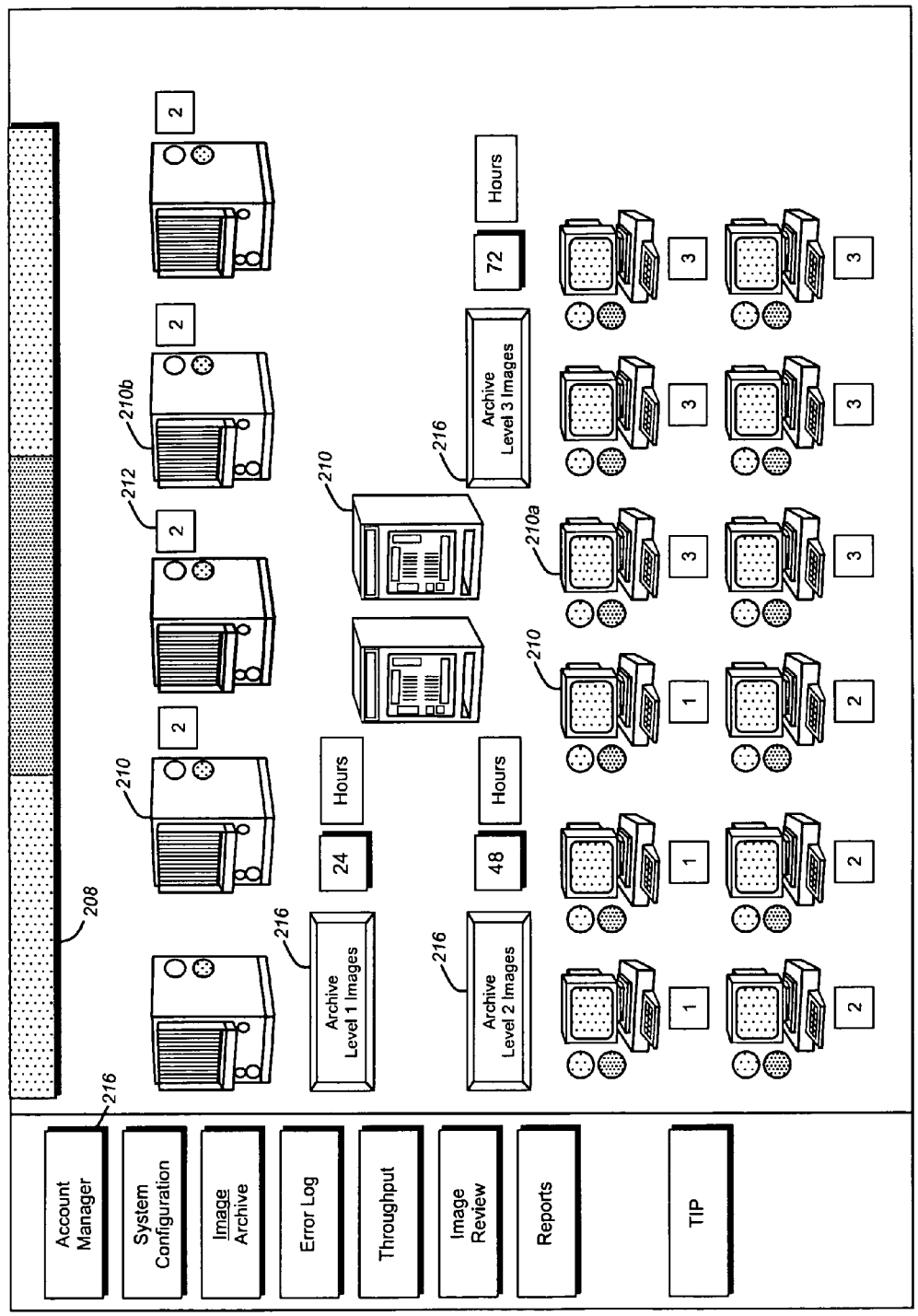
FIG. 3 is an exemplary illustration of a display that may be visible on an operator interface forming part of the local network of FIG. 2.

FIG. 3 illustrates one example of a display 208 on the operator interface 206. The display includes machine icons 210 representing each of the baggage inspection machines 202 (FIG. 2) in the local network. The inspection machines may include workstations 210a or mainframes 210b. In one example, the remote access bridge may change the appearance of the icons on the display 208 depending on a condition of the machine represented by the machine icon 210. For example, machines that are in an active condition may be represented by icons having a certain appearance, for example, a particular color, while machines that are in an off-line condition may be represented by, for example, gray icons. Machines that are in a fault condition may be represented by icons that are, for example, red or blinking. The remote access bridge may continually update the display so that the machine icons represent a current status of each inspection machine connected in the network. In some examples, an airport or other terminal may employ multi-level baggage screening, as illustrated in FIG. 1. In these examples, the remote access bridge may update the display 208 to indicate to which level each particular machine belongs, and may group the icons representing the machines according to levels of screening. For example, a machine icon may include a number 212 indicating that the machine represented by that machine icon is, for example, a level 2 inspection machine.

According to another example, each machine icon may include a decision indicator 214. The remote access bridge may alter the appearance decision indicator based on information received, either from the inspection machine associated with that icon or from the operator, regarding a clearing decision made about an item under inspection. For example, if one of the inspection machines in the network examines an item under inspection and a decision is made to clear the item, the decision indicator 214 may, for example, blink green. Alternatively, the decision indicator 214 may blink red for a reject decision, or may display, for example, magenta if the decision does not occur within a predetermined amount of time. The display 208 may further include menus or radio buttons 216 to enable an operator to access additional data. For example, the remote access bridge may store statistical data, regarding, for example, the percentage of items under inspection that are cleared as opposed to rejected within a certain time period, e.g., a day, month or year. The remote access bridge may also archive X-ray images of all items of baggage that are inspected by the machines connected to the local network, which the operator may access using the buttons 216. The menus or buttons 216 may also enable the operator to access report files generated by the remote access bridge, error logs, and system configuration information, as will be discussed in more detail below. It is to be appreciated that the remote access bridge and/or operator interface may be provided with another means for accessing the report files, error logs and system configuration information, other that the menus or buttons 216.

Figure 4A:
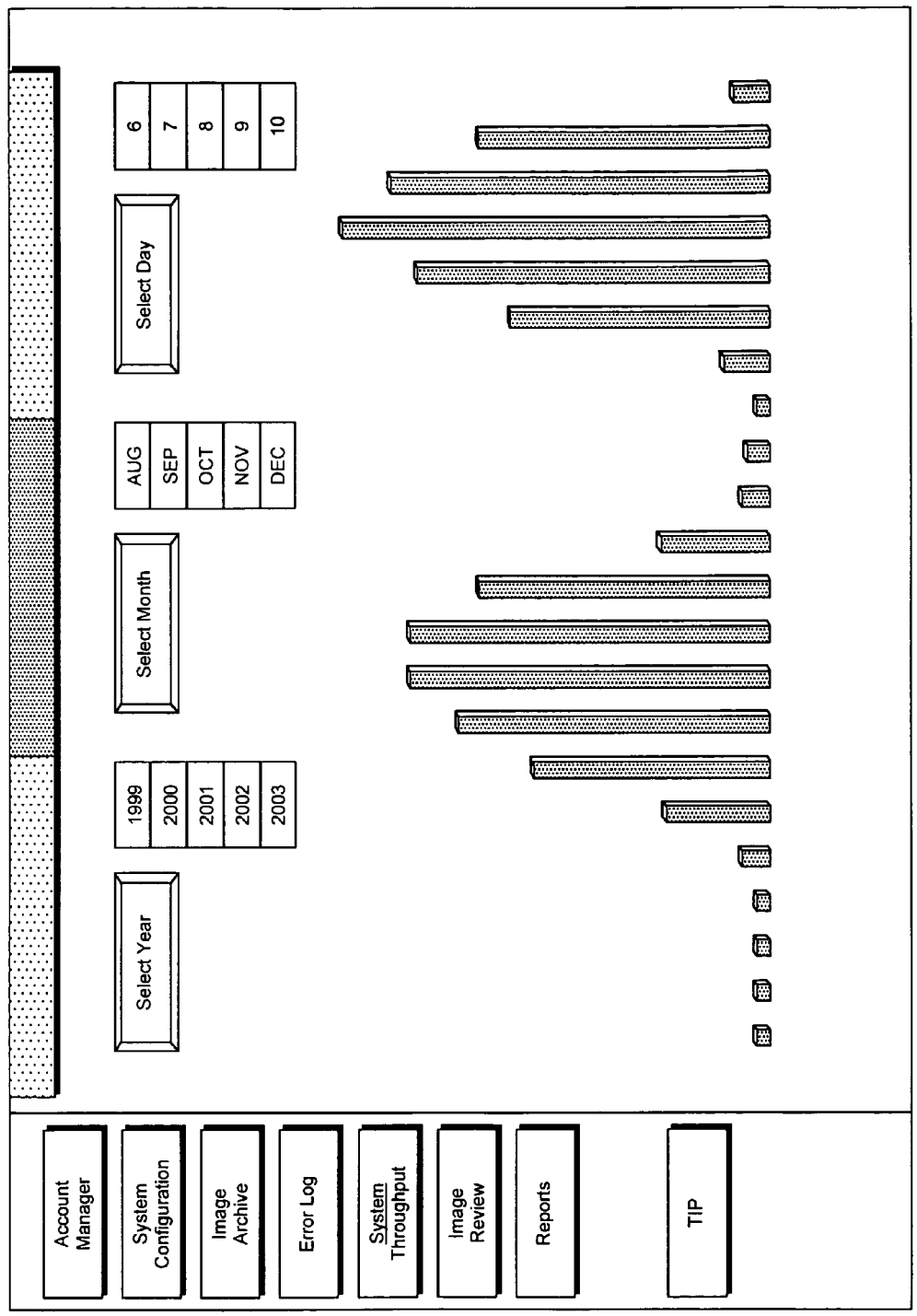
FIG. 4a is an exemplary illustration of statistical data that may be displayed on the operator interface of FIG. 2.
Figure 4B:
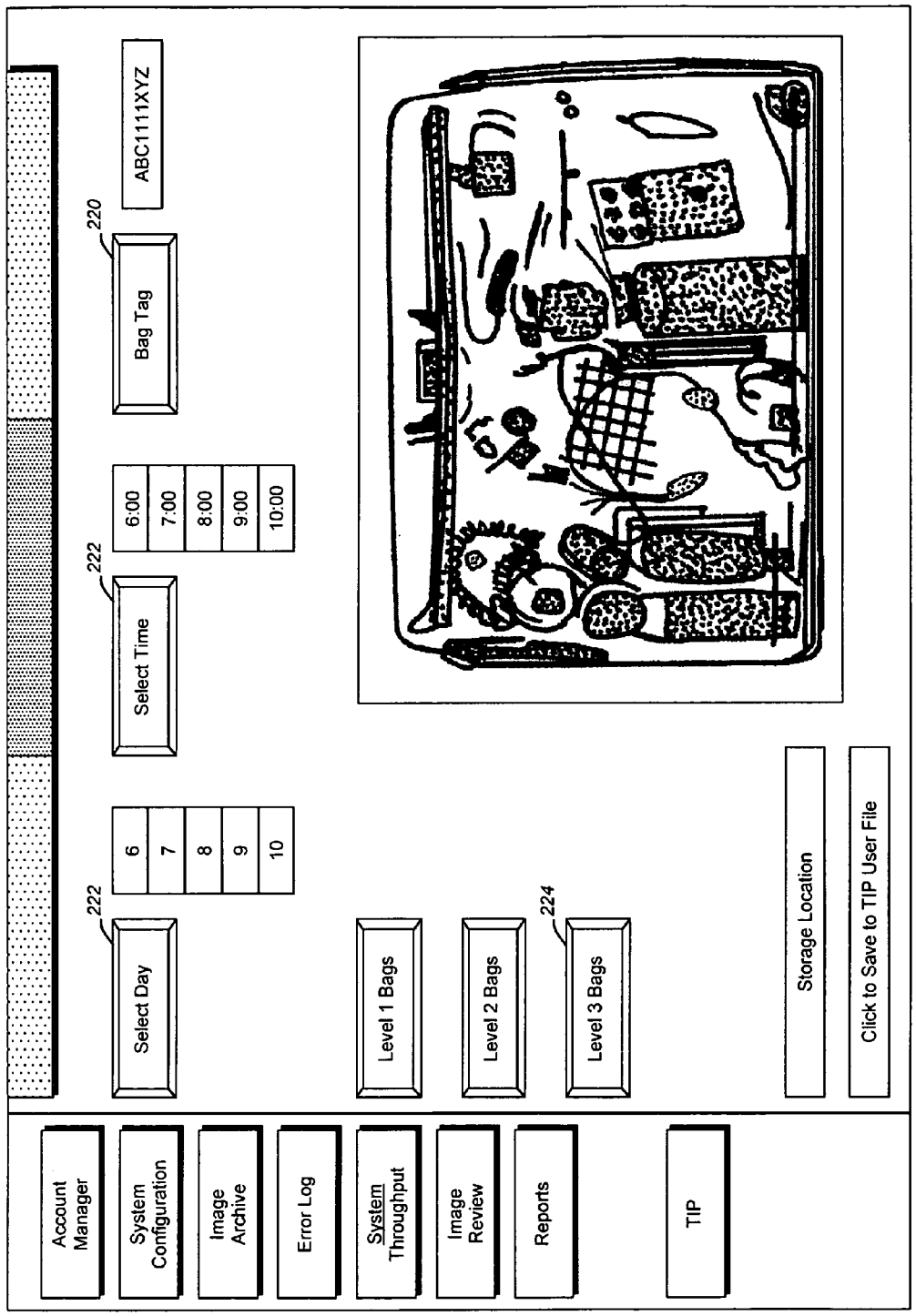
FIG. 4b is an exemplary illustration of an X-ray image on an item under inspection that may be displayed on the operator interface of FIG. 2.

Referring to FIG. 4a, there is illustrated one example of statistical data that may be displayed by the operator interface. As illustrated, the display 208 may provide for the operator to select a date for which the information is displayed, and may also select whether the data is from the entire network, or for example, from the level two inspection machines, or from a particular individual machine. FIG. 4b illustrates an X-ray image of an item under inspection being displayed on the display 208. As illustrated, an operator may select the image corresponding to a particular item under inspection based on a item identifier 220, or by day and time using select buttons 222. Using buttons 224, the operator may also select to display images from a particular level of inspection.

Figure 5:
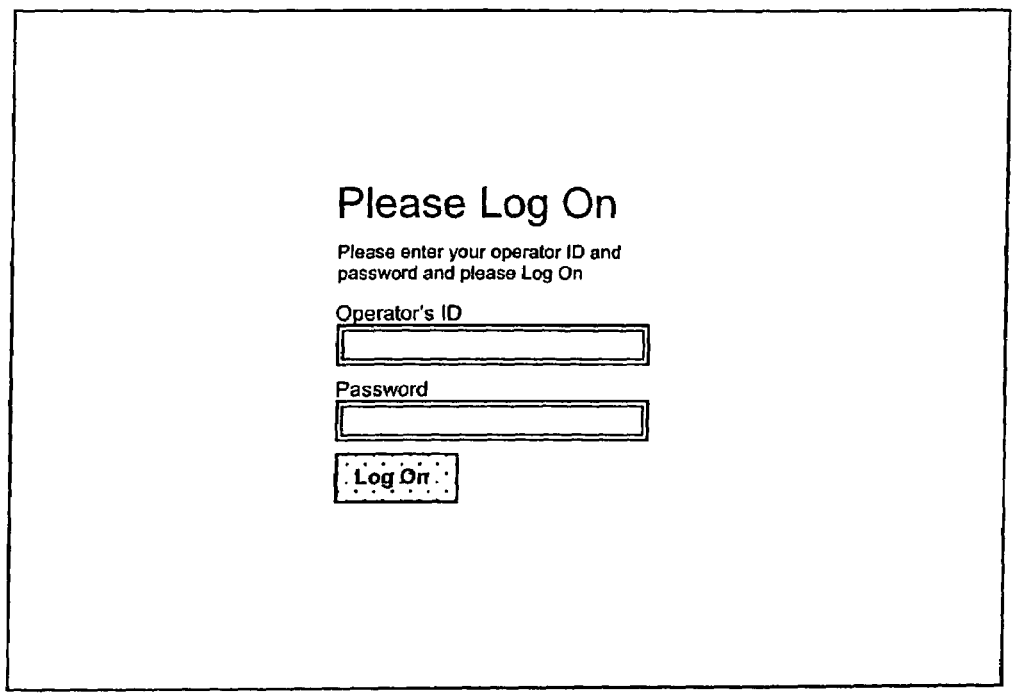
FIG. 5 is an exemplary log-on screen that may be displayed on the operator interface of FIG. 2.

Referring again to FIG. 3, in one example, an authorized operator may be able to program the remote access bridge to store data from each machine in the network for a predetermined amount of time, indicated by buttons 218. These predetermined amounts of time may be different depending on, for example, the level to which the inspection machine belongs. The remote access bridge may require an operator to securely log on to the operator station to access the system. An exemplary log-on screen that may be displayed on the operator interface is illustrated in FIG. 5. The operator may be required to enter an operator ID 230 and a password 232, in order to gain access to the information stored by the remote access bridge, and also to alter the configuration of the inspection machine connected in the network. Different levels of access may be provided to different operators. For example, there may be an administrator class of operators and a user class of operators, similar to those commonly used on many local area networks. As mentioned above, the remote access bridge may also generate reports regarding screening decisions, online and offline activity of various machines in the network, and faults that occur at different machines and the time at which a fault occurs. These reports may be generated according to a selected time period, for example, by the hour, daily, weekly or monthly.

Thus, the remote access bridge allows an authorized operator, access to the information and data collected by the baggage inspection machines, and configuration of baggage inspection machines within the local network connected to the remote access bridge. This allows a single operator at an operator station to monitor and control a plurality of baggage inspection machines throughout a particular airport, or other screening location.

According to another embodiment, one or more local networks of baggage screening machines may be coupled to a remote access server which gives a remote operator the ability to manipulate and access information on a virtual network of machines, as if the operator were using the remote access bridge described above. The remote access server, however, allows the operator to be located on a different premises to the network of baggage screening machines. In other words, via the remote access server, an operator not connected on the same subnet or local network as are the inspection machines may access and manipulate information gathered by the local network of machines. The operator may access the local network via, for example, the Internet. The remote access server thereby enables remote baggage screening by an operator located anywhere in the world. In addition, the remote access server allows the operator to view X-ray images collected by the inspection machines, to perform remote screening of items examined by the machines, as will be discussed in more detail below.

The remote access server differs from the remote access bridge discussed above in at least two aspects. The remote access bridge allows an operator connected on the same subnet as the local network of inspection machines, access to the machines' configuration settings and statistical information collected by the machines. The remote access server allows an operator connected on the same local network, full access to not only statistical information and configuration settings, but also to X-ray and other images and data collected by the local network of inspection machines. The remote access server also enables an operator not connected on the local network, but remotely located, full access to the local network of machines, and information, including, for example, images of items under inspection, etc. Thus, via the remote access server, a remote operator possibly located in a different city, or even a different country from the local network of inspection machines, may access all information, and data from the local network. It is to be appreciated that an operator accessing the remote access server may be connected on the same subnet or local network as are the inspection machines, but may also access the local network via, for example, the Internet, or another long-distance access means.

Figure 6:
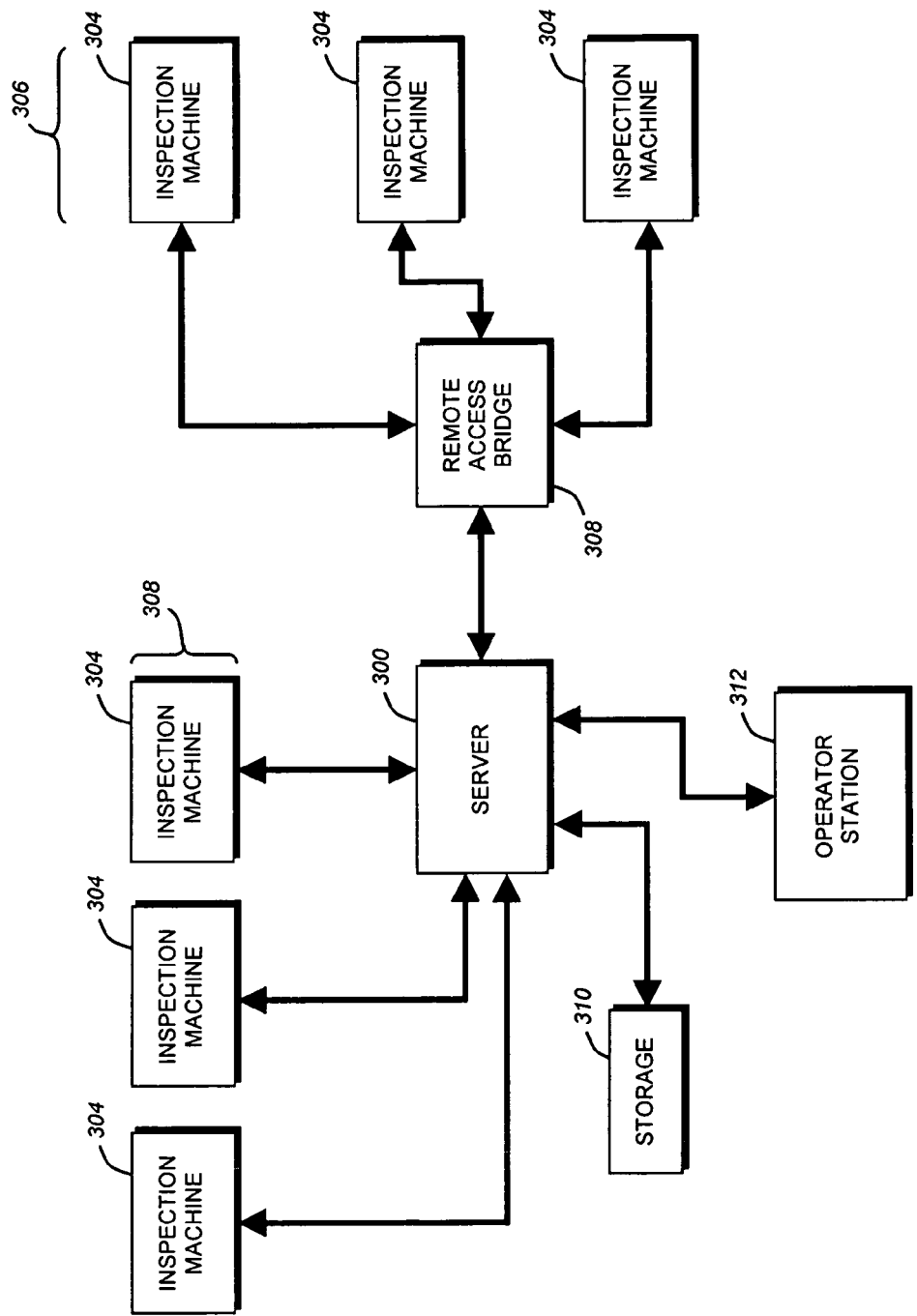
FIG. 6 is a schematic block diagram of an exemplary remote access system according to the present invention.

An exemplary system according to this embodiment is illustrated in FIG. 6. The system includes a remote access server 300 and one or more local networks of inspection machines 302, 306 coupled to the remote access server 300. Each local network 302, 306 may include a plurality of inspection machines 304, including both workstation and mainframes. It is to be appreciated that a local network of baggage screening machines 306 may be coupled to a remote access bridge 308, as described above, which may serve as a central controlling computer for the local network 306, but that this is not required. The remote access server may be also coupled to a storage element 310 and a remote operator station 312. The remote access server 300 allows an operator using the operator station 312 to independently access each baggage screening machine 304 in each of a plurality of local networks of machines, and information collected by the machine, without the need for a central controlling computer at each local network. Through the remote access server 300, an operator may observe the system operation, change configuration settings on any machine 304 connected to the network, and interact with various parts of the network. The remote access server system allows end users, such as arrival side (for example destination airports) baggage inspectors to retrieve information about baggage that was acquired by departure-side (for example, point of origin airports) screening machines. The remote access server 300 allows a remote operator to interact with a local baggage screening network from any operator interface 312 connected to the local network via, for example, a secure Internet connection.

According to one embodiment a local network of inspection machines 302 may be located at a first airport. An item of baggage, hereinafter referred to as an item under inspection, may be examined by an inspection machine 302 which may obtain information about the item under inspection, for example, an X-ray image of at least a portion of the item under inspection. The item under inspection may be provided with a unique item identifier that may be used to link the information obtained by the inspection machine with the item under inspection. The information, for example, the X-ray image may be stored in the storage element 310 which may be located at the first airport or at another location. Operators at the remote operator station 312, which may be located at, for example, a second airport, may access the stored information/images from the storage element via the remote access server 300. For example, an item under inspection may be imaged by an inspection machine at a departure airport of a passenger. While the passenger is in flight, the X-ray data for, and other information regarding, the item under inspection may be retrieved through the remote access server by an arrival-side authorized operator. The arrival-side operator may view the image of the item under inspection alone, or may use the results of a departure-side automated detection algorithm, or may apply another detection algorithm to the stored X-ray data retrieved via the remote access server.

The X-ray data and/or other information obtained about the item under inspection may be combined with passenger manifest information, and/or other flight or airport information such that detection algorithms may be tailored to a specific passenger's point of origin or other passenger information. The unique item identifier, which may be, for example, a barcode or radio frequency (RF) transponder encoded with a unique code and attached to the item under inspection, may be used to link the X-ray images of the item with passenger and/or flight information stored in a database. Such information may include a digital photograph of the passenger, possibly carrying the item, and/or other information, for example, the passenger's passport number. In one example, an operator may be able to access X-ray images and information for baggage associated with a particular flight, or may be able to access images and/or information relating to an individual item of baggage using the unique item identifier. Checked baggage may be examined separately from hand-carry baggage which may also be inspected using automated or conventional methods. Once the passenger and baggage information is stored in the database linked to the remote access server, an operator may access that information from any location world-wide. It does not matter whether the information is automatically stored in the database during inspection of the items of baggage at their point of origin, or whether the information is manually entered by other operators.

Figure 7A:
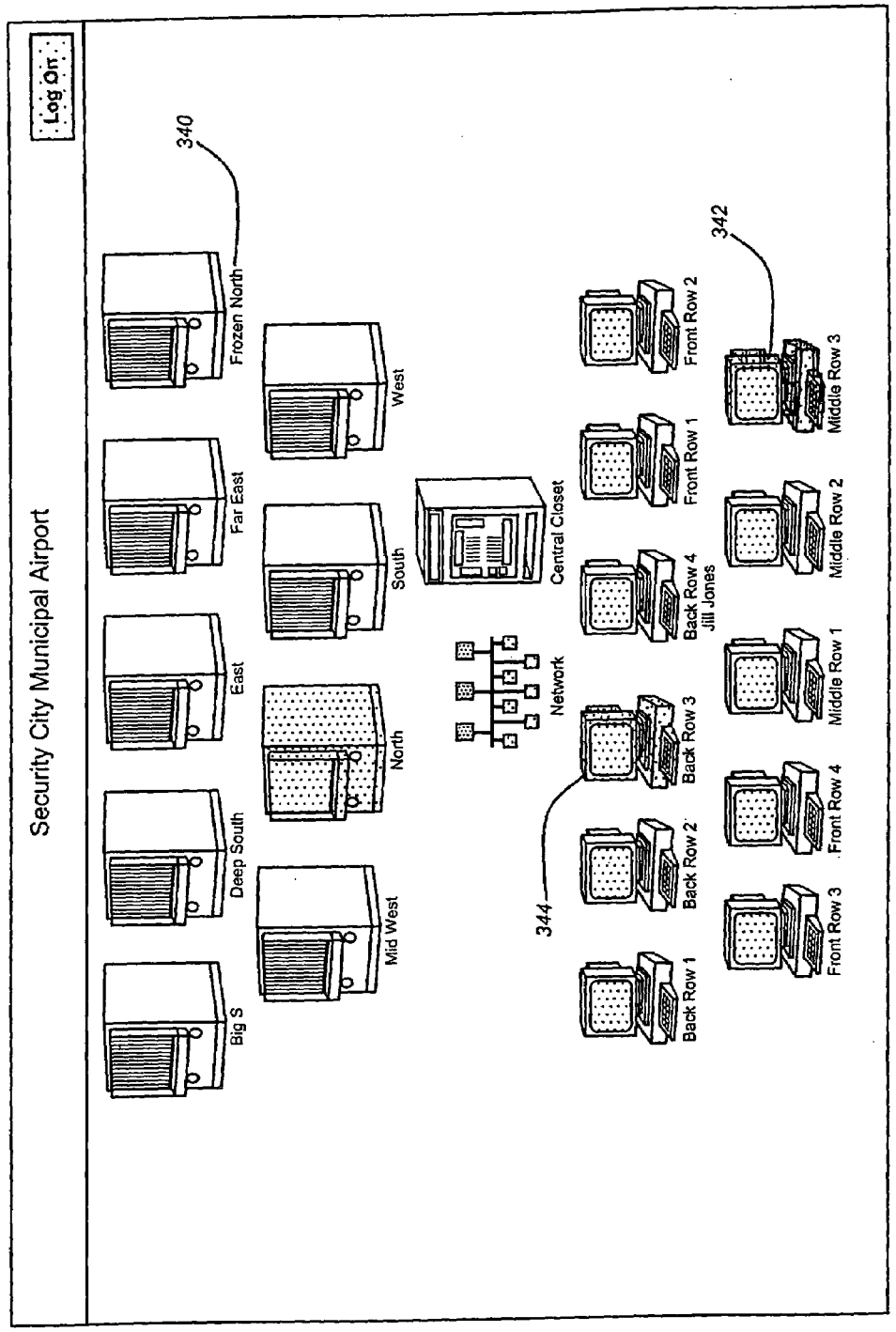
FIGS. 7A–7F are exemplary displays provided on the remote operator interface of the system of FIG. 6.
Figure 7B:
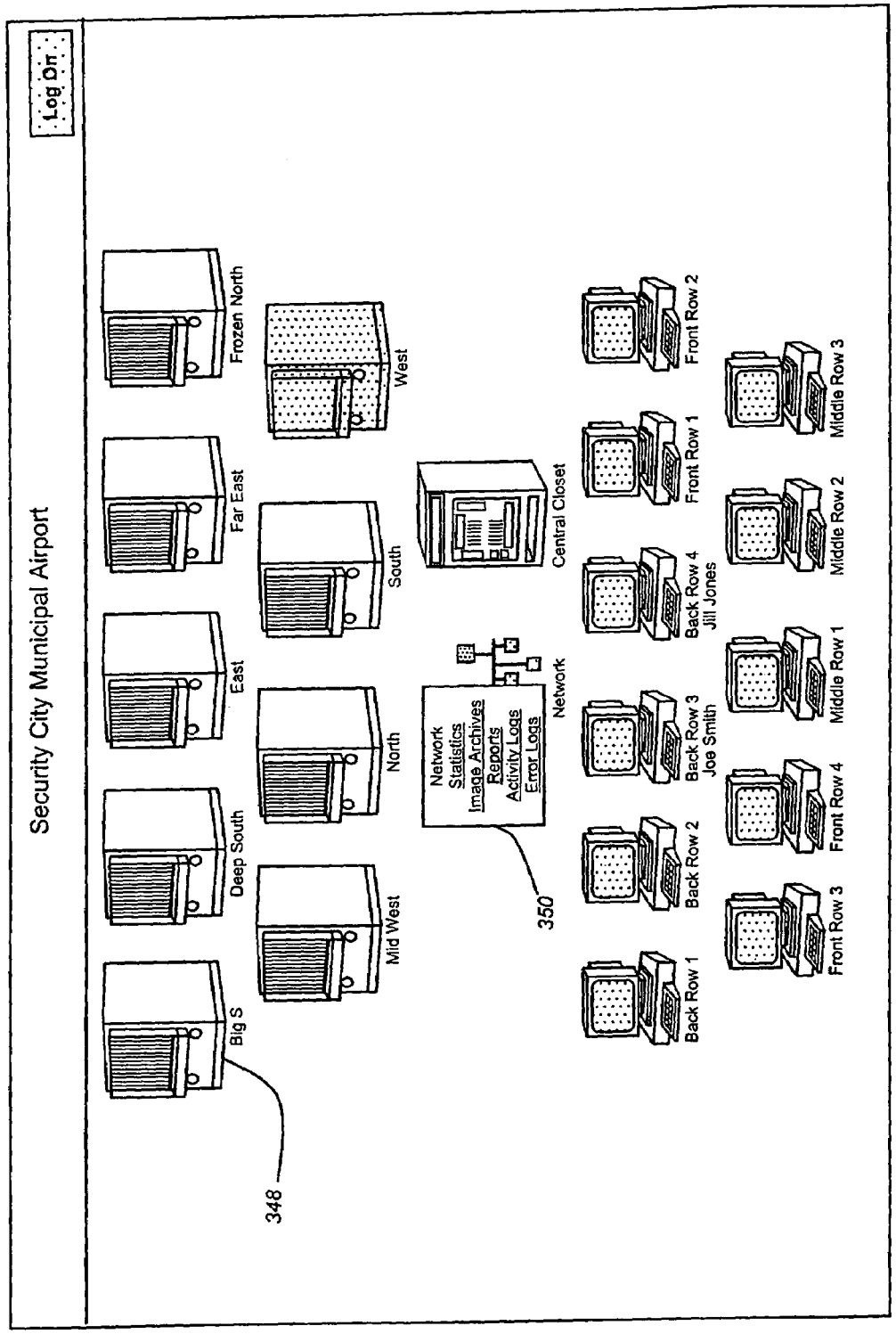
Figure 7C:
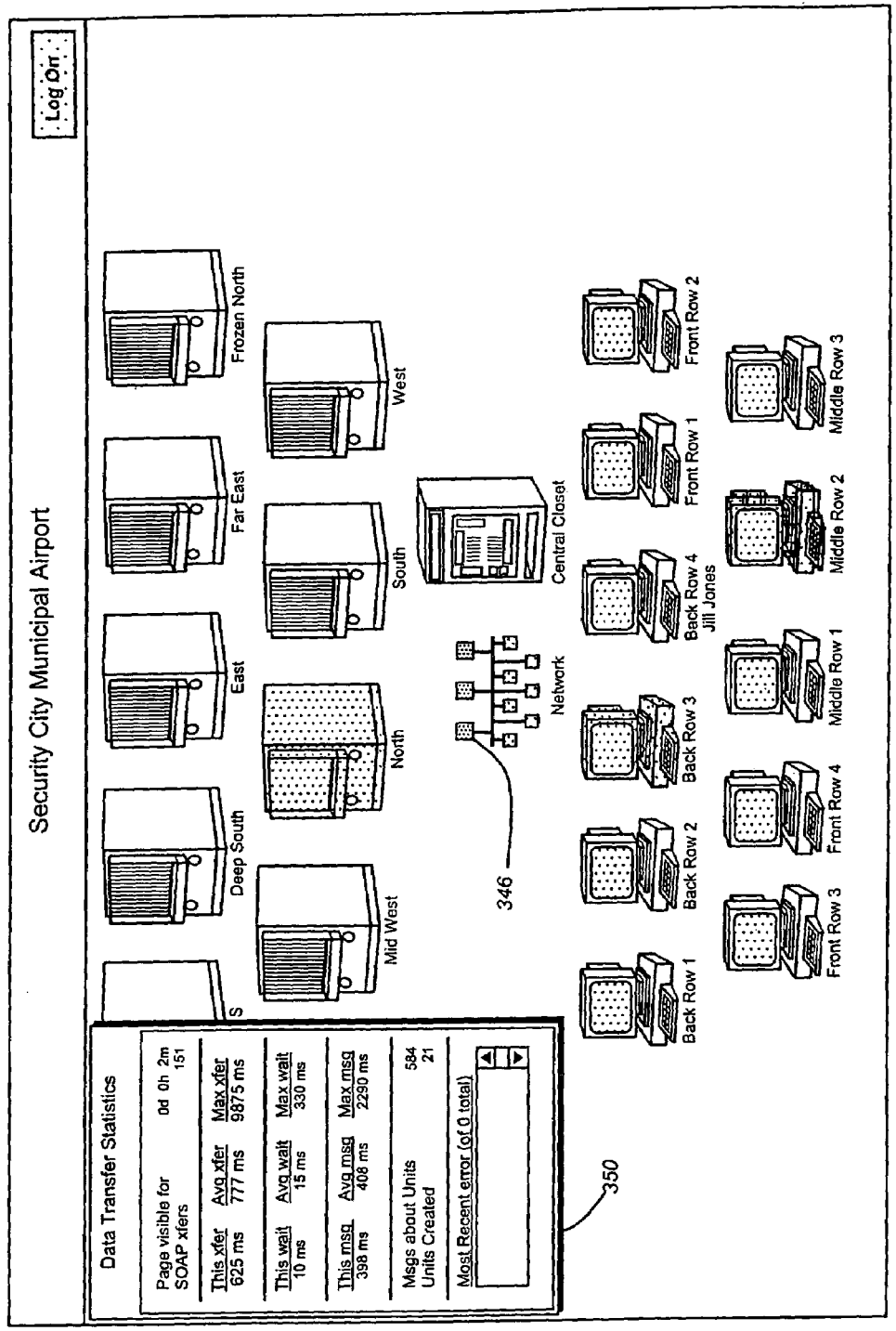
Figure 7D:
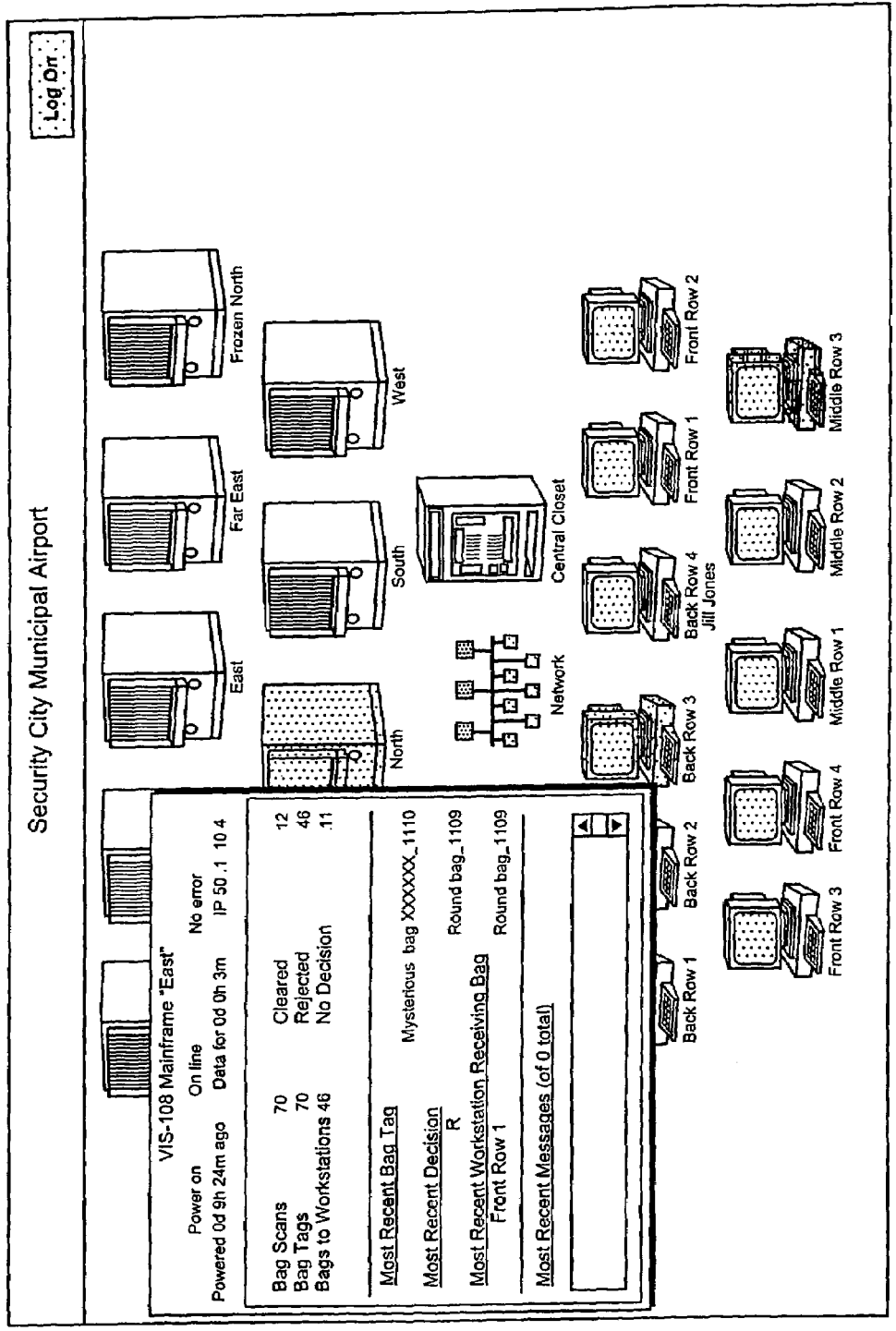
Figure 7E:
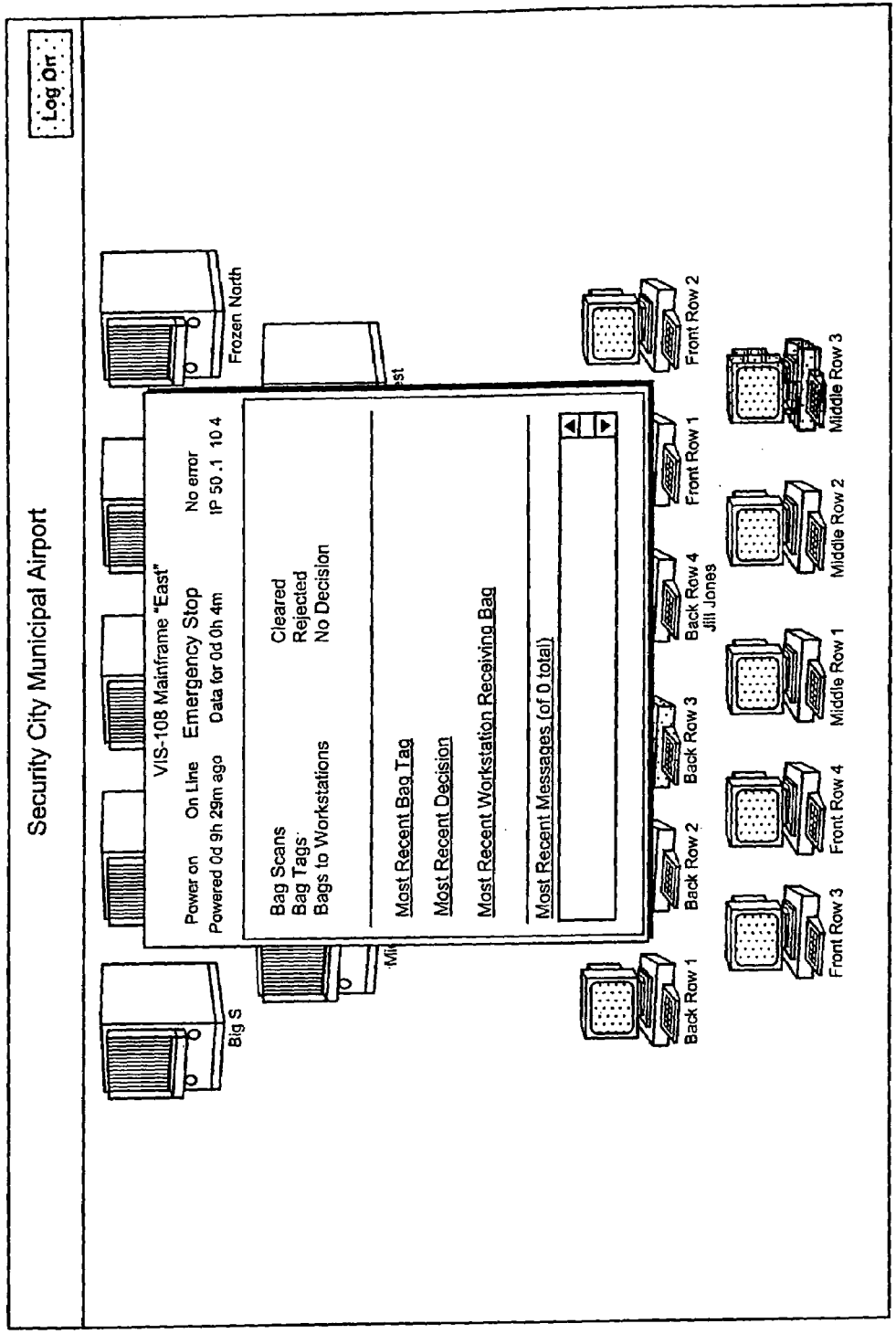
Figure 7F:
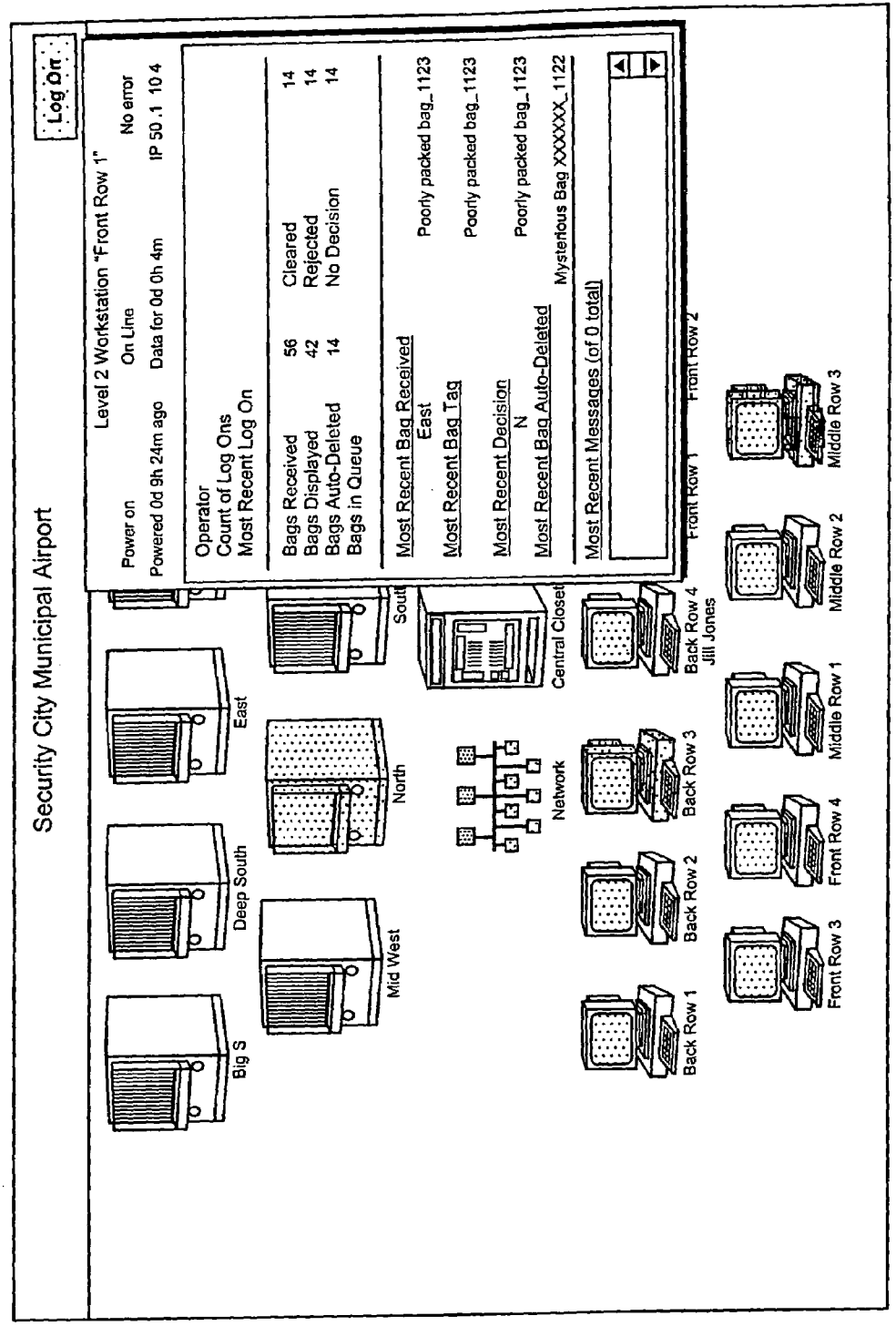

According to another example, the remote access server 300 may update the display at the remote operator interface 312 in response to requests from the remote operator interface 312. For example, the operator interface may display icons representing a plurality of inspection machines connected in the network, as illustrated in FIG. 7A. Each icon on the display may include an indicator 340 that tells the operator to which local network the inspection machine belongs, or at which airport the inspection machine is located. As discussed in relation to the remote access bridge, the remote access server may alter the appearance of any icon on the display to reflect a condition of the machine represented by the icon. For example, in FIG. 7A, an icon 342 is shown in a fault condition, and an icon 344 is shown in an offline condition. By accessing the display, for example, by clicking on the network icon 346 or on a machine icon 348, an operator may access various menus 350, as illustrated in FIGS. 7B–7F, allowing the operator access to system, network and machine information and statistics. By clicking on any icon, the operator may access information and statistics regarding the machine or local network represented by that icon. FIG. 7C illustrates information obtained by selecting the network statistics option on the menu 350 of FIG. 7B. FIGS. 7D and 7E illustrate statistical information displayed for two mainframes, and FIG. 7F illustrates information displayed for a workstation.

Figure 8:
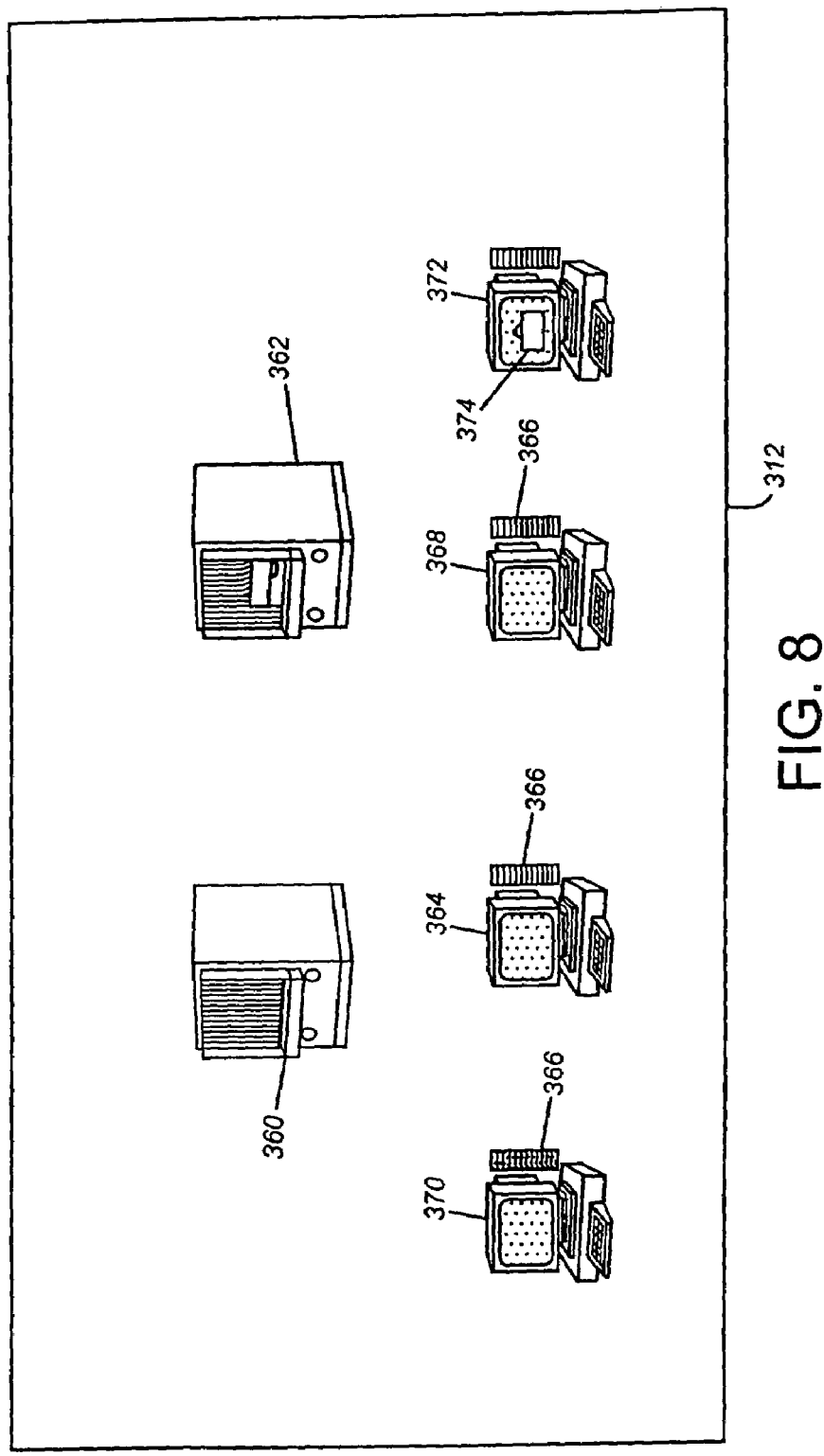
FIG. 8 is a representation of various icons that may be displayed on the operator interface of the system of FIG. 6.

According to another embodiment, the remote access server 300 may further alter the appearance of icons on the display to illustrate activity at the various inspection machines in the network. FIG. 8 illustrates a plurality of icons, representing mainframes and workstations, that may be displayed on the remote operator interface 312. It is to be appreciated that FIG. 8 is not intended to show the appearance of an actual display screen, but to illustrate examples of the appearance of various icons to provide information to the operator. For example, icon 360 represents an inspection machine that is not currently inspecting an item, whereas icon 362 represents an inspection machine that has recently examined an item. The icons may be continuously updated by the remote access server to reflect activity at each of the inspection machines in the network. It is to be appreciated that the icons may be changed to reflect the type of activity occurring at a particular machine, without necessarily providing an exact indication of the arrival and disposition of items under inspection. The remote access server may provide a simulated activity at a rate that mimics the current rate of activity at the machine represented by the icon.

In another embodiment, at least some of the workstation icons 364 may be provided with a queue indicator 366 that may indicate a size of the item under inspection queue at the corresponding workstation. As shown, the queue indicator 366 of icon 364 is empty, indicating that the queue for the workstation represented by icon 364 is currently empty. As the workstation's queue fills up, the queue indicator at the corresponding icon likewise fills up, as shown at icon 368. In one example, the color of the queue indicator may change, for example, form green to red, as the queue fills up. Icon 70 represents a workstation with a full queue. It is to be appreciated that the queue indicator is intended as a visual indicator of the state of the queue of the corresponding workstation, and is not necessarily intended to be an exact indicator of the number of items awaiting inspection at the workstation. It is further to be appreciated that the icons representing mainframes may also be provided with queue indicators. A workstation icon 372 may further be updated to illustrate that an item is currently being inspected by the workstation, or that a suspicious region has been detected in an item under inspection, by showing an image 374 of the item on the workstation icon.

Figure 9:
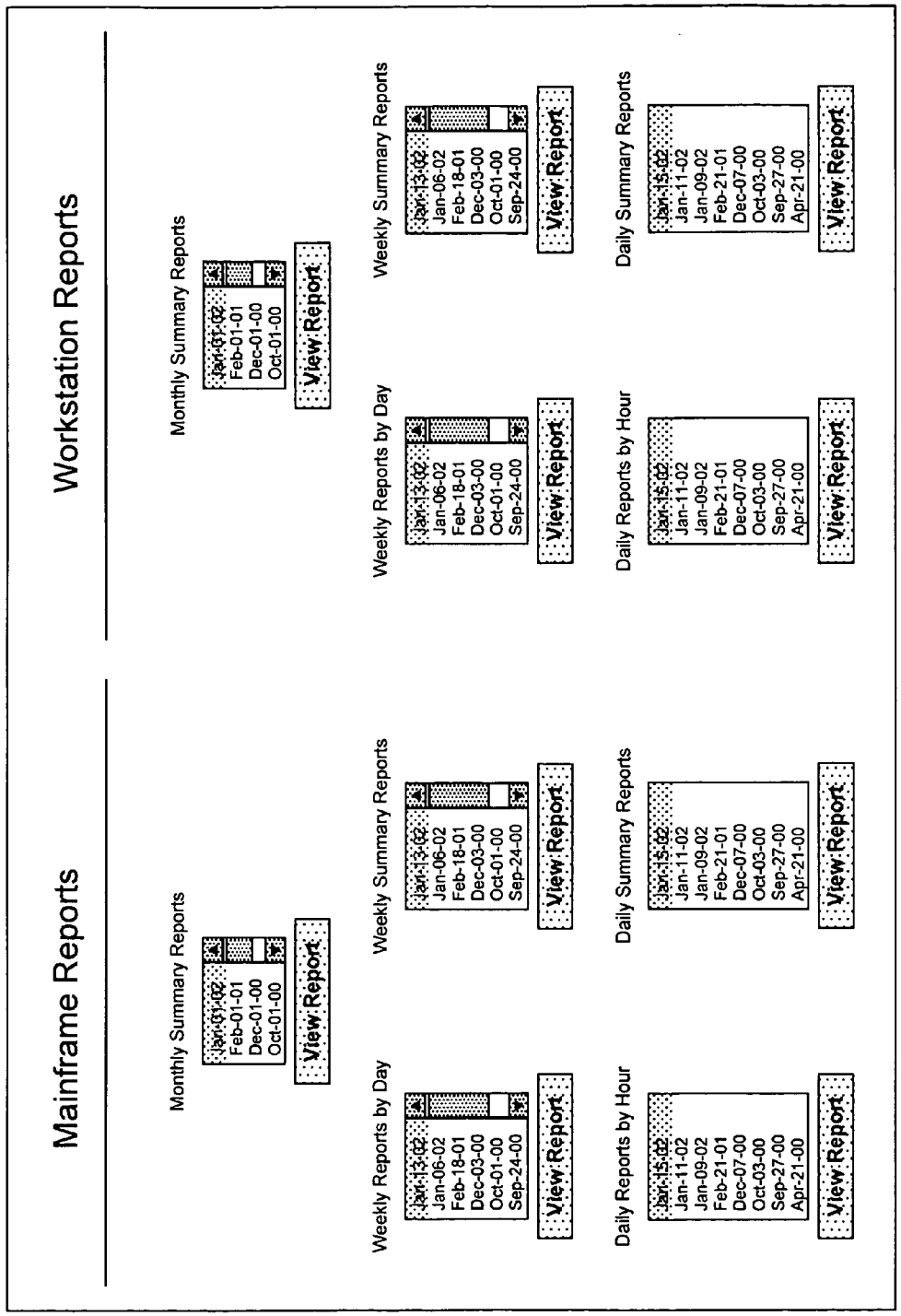
FIG. 9 is an exemplary display illustrating a number of reports that may be selected for view.

As discussed above in relation to the remote access bridge, the remote access server may be adapted to generate reports regarding, for example, the number of items inspected, the number of faults occurring at various machines, etc. An operator may request such a report my clicking on an icon on the display. FIG. 9 illustrates an example of a display where an operator may select one of a plurality of reports to view.

Referring again to FIG. 6, in one embodiment, X-ray images of passenger bags for arriving flights for an entire airport may be collected by the remote access server 300 from local networks 302, 306 of inspection machines 304 located at the point of origin airports of the arriving flights. The images and information may be stored in a central database, for example, storage element 310, and may be inspected by a centralized team of operators, or by an automatic detection algorithm, at operator station 312. The remote access server 300 provides all the features and utility discussed above in relation to the remote access bridge, and additional features and utility, to a remotely-located operator. When a unique item identifier, corresponding to arriving passengers baggage, is entered into the system, the results of the inspection of that item may be presented to an arrival-side screening agent. These results may include the X-ray image of the item and other information, or may be a simple as a decision indicator, for example, a green light for "all clear" or a red light for "inspect further." Several different arrival-side authorities may have access to the same passenger bag images via the remote access server 300. For example, if a US customs inspector has cleared a bag, but a US Department of Agriculture (USDA) inspector wishes to further examine the bag, the customs inspector may see an indication that the passenger must go through USDA. before being cleared, when the item identifier is entered into the system. This system has a number of advantages, including that airlines may retrieve bag images to investigate insurance claims for lost items, the weight, size and other physical characteristics of passenger baggage may be stored and analyzed for airline and airport planning, and governmental authorities may inspect the bag images in the event of a terrorist attack on a flight. Each unique item identifier may be linked to an inspection machine serial number, and/or a time and date when the image was created, allowing for detailed tracking of items of baggage. Results of an automatic detection algorithm may also include specific details such as the serial number of the inspection machine, geometry, and operating and service history for that machine.

According to one example, image search tools may be employed to select images from a large database of real images for training purposes. These images may be used to established algorithm training sets from a large number of bags, perhaps randomly selected over the course of many days, months or years. These training sets may be used to train operators, or automated detection algorithms. The system provides owners, and operators of X-ray inspection equipment with information as to the current status of baggage information, operator workload, decision time, percentage of bags rejected, etc. for a group of connected inspection machines. This information may be useful for system maintenance and planning. It is to be appreciated that although the above discussion focused on passage baggage screening for airlines, the system may be used in a number of other applications. For example, the system may be used to screen cargo instead of passenger bags, or may be used for non-destructive testing during manufacturing processes.

As discussed above, the remote access server provides an interface to a connected group (network) of baggage screening equipment. According to one embodiment, the remote access server operation may be based on Internet server software which may enable access of the server through the "web page" paradigm. This paradigm provides benefits in the form of familiar graphical user interface an established and available software and methodologies. The remote access server software may provide a web-based interface that may be remotely accessible by operators through a commercially available browser which may be operating either on the remote access server itself or on a remote computer. Remote computers may be located at any site worldwide, and commercially available security and encryption methods may be used to protect sensitive data. Some examples of such security methods include, but are not limited to, secure socket layer (SSL) protocol and virtual private network (VPN) protocol. It is to be appreciated that the term "computer" as used herein refers to a computing machine in the generic sense, and applies to any type of portable, personal or mainframe computing device including one or more processors. It is further to be appreciated that the term "computer program" is used herein in a generic sense to refer to any type of computer code (e.g., software or microcode) that can be employed to program one or more processors so as to implement aspects of the present invention.

According to one embodiment of the invention, the remote access server includes a collection of co-operating processes and services that have access to a network of inspection machines and is able to serve web pages. Users of the remote access server may access the web pages through commercially available browsers (a commercially available internet interface program, such as Internet Explorer, or Netscape Navigator) running either on the remote access server itself or on a remote computer located at any site world wide. Commercially available security and encryption methods can be used to protect sensitive data. The browser may operate on the same computing machine as the remote access server or on a different one. The remote access server software may provide delivery of web pages, delivery of real time information, and maintenance of data on a browser, through a number of different protocols while maintaining the same graphical user interface. Images of items under inspection, gathered by the network of baggage screening equipment, may be stored on some storage medium for access by operators through the remote access server interface. The storage medium may include a database, including a commercially available program, for example, Oracle, that has a structured query language interface available via open database connectivity. The database may be located on the same computing machine as the remote access server, or may be separate from the server The remote access server may offer remote viewing of inspection data, for example, images of the items under inspection, other data, such as the locations serviced by the system, and remote report generation.

Figure 10:
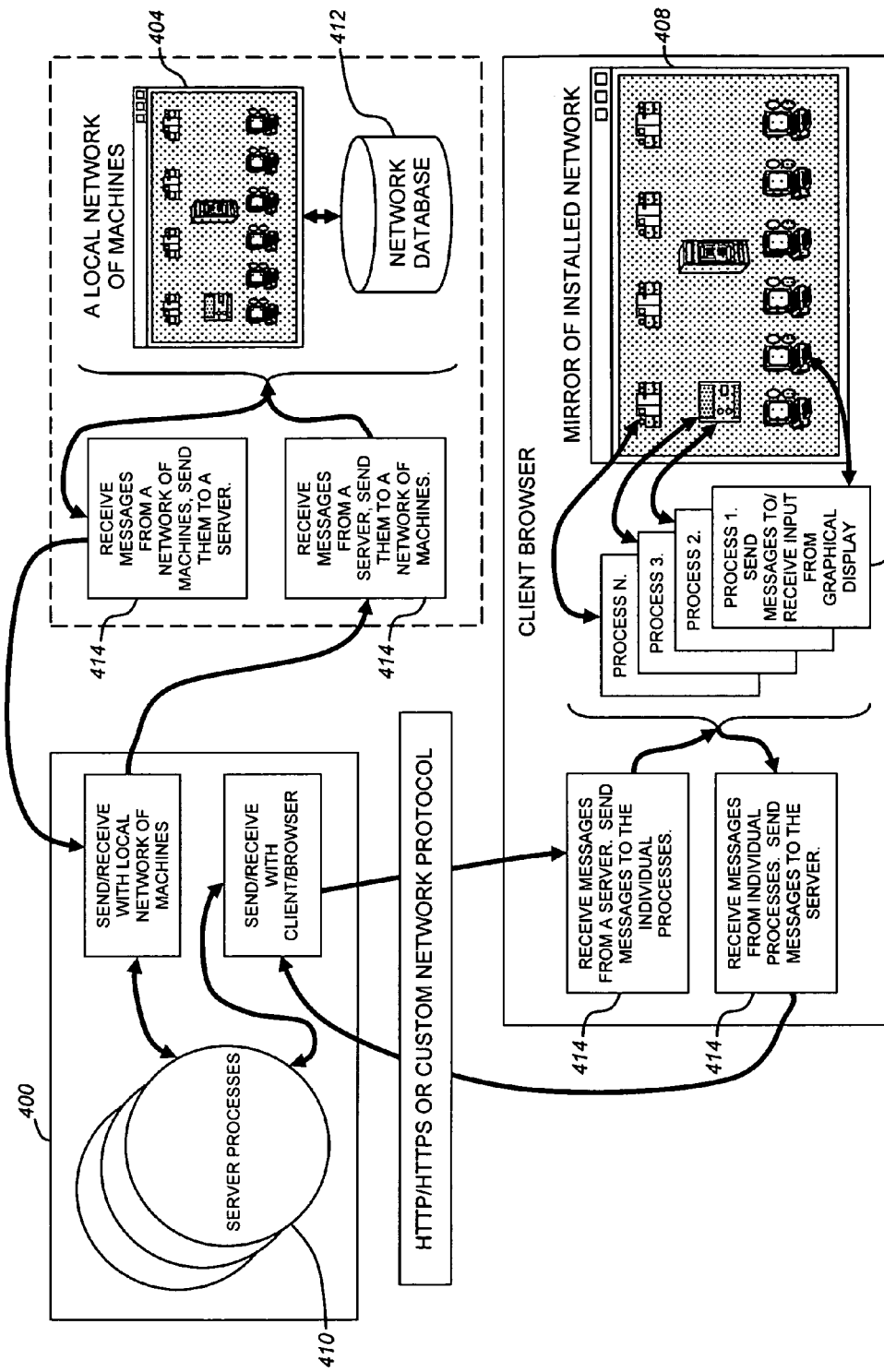
FIG. 10 is a schematic block diagram illustrating communication between elements of the system of FIG. 6.

Referring to FIG. 10, there is illustrated an exemplary embodiment of a system including a remote access server 400 coupled to one or more local networks 402 of inspection machines 404, and a remote operator interface 406 that includes a graphical user interface 408. The remote access server 400 may include a plurality of processes 410 that may run in different threads to control aspects of the systems, such as interfacing with the local network of inspection machines and with the operator interface. Although not illustrated, the local network 402 may include a central controlling computer, such as a remote access bridge (326 FIG. 6). However, as discussed, it is to be appreciated that provision of the remote access bridge is optional, and not necessary. In the illustrated embodiment, database 412, which may store information and images obtained about items under inspection that were examined by the local network 402 of inspection machines, is shown located at the same location as local network 402. However, it is to be appreciated that database 412 may equally be located on the same computing machine as the remote access server 400, or may be located at another, remote location. Furthermore, the system may be provided with a plurality of storage elements in addition to database 412 that may store system information.

According to one embodiment, the remote access server 400 may provide a secure log on methodology to prevent unauthorized access to the system. In one example, a log-on screen that may be presented on the display of the operator interface 406 may be that illustrated in FIG. 5. In one example, the remote access server may provide a secure method for logged on administrators to manipulate a database of operators who may log on to the system. The remote access server may also allow authorized operators to run diagnostic tests on the inspection machines connected to the network, and to receive the results of such tests, whether initiated remotely or locally. The remote access server may further allow authorized operators to examine error logs and other files maintained at the individual inspection machines of the network.

Once authorized operators have logged on, the remote access server may provide a secure method for the authorized operators to control individual inspection machines in the network, and local networks as a whole. As discussed above, access to the system may be provided through a web page based display (graphical user interface 408) on the remote operator interface 406. Web pages may be delivered either by hypertext transfer protocol (HTTP), secure hypertext transfer protocol (HTTPS), or another secure methodology. The graphical user interface 408 presented on the display may be the same regardless of which protocol is used to deliver the web pages, but the security of the transmission may vary. When the browser and the remote access server operate on the same computer, the need for security is minimized and a less secure protocol may be used for data transfer between the server and the browser. When the remote access server is located on a remote computer, a more secure protocol may be required to ensure integrity of the data and to prevent improper access.

The operation of the browser and the remote access server may be designed around an Internet home page that is loaded infrequently and satellite pages which may be opened in other windows on the display as required. Delivery of these pages may use the common gateway interface (CGI) which is part of conventional HTTP and HTTPS specifications. Common gateway interface programs that deliver reports to the operator interface 406 may use open database connectivity (ODBC), a standard database interface, to access the database 412. The database 412 may employ any commercially available program, and may store the X-ray images and other passenger and system operation information. When the browser and the remote access server are operating on the same computing machine, there may be no need for a secure transmission protocol. However, when the browser is operating on a remote operator interface 406, it may be desirable to provide a secure transmission protocol to prevent unauthorized interception of the data.

According to yet another embodiment, the remote access server may be adapted to deliver real-time information to a web page displayed on the browser on the remote operator interface 406 without reloading that page. One exemplary methodology that may be utilized to perform this task is on a Simple Object Access Protocol (SOAP), although the remote access server is not limited in this regard and any suitable protocol may be used. SOAP allows the delivery of information using the HTTP protocol without disrupting the web page that is on view on the browser. According to one exemplary method of using SOAP for delivery of real-time information, the remote access server 400 may collect real-time information from various inspection machines 404 and equipment in the network, and may save the information in the database 412 using the open database connectivity interface. The remote access server 400 may make the information stored in the database 412 available via pipelines, shared memory, or another real-time interface to a SOAP server. One or more of the CGI programs (server processes 410) running on the remote access server may act as a SOAP server. This program may be written in various languages including, for example, Perl or Java. Conventional open source SOAP implementations are available for these two languages. A SOAP receiver operating within the browser on the remote operating interface 406 may also be implemented using Java and available Open Source SOAP implementation for Java. To allow the SOAP operations to be asynchronous from the web page operations, this receiver may use a separate thread. Using the CGI programs and SOAP, the remote access server may send directions to a remote access bridge located at the local network 402, as if an operator were present at the remote access bridge console. The remote access server may process the remote access bridge responsive and make them available to the remote access server. Thus, the remote access server uses SOAP to make the functionality of the remote access bridge available to the remote operator interface. However, the functionality of the remote access server programs is not limited to SOAP, and may use any other known or future developed protocol.

According to another embodiment, the remote access server may use the document object model standard, which is a developing world wide web standard for dynamic modification of web page contents on a browser, to update the information displayed on the web pages of the browser operating on the remote operator interface. The programming language for the document object model programs may be JavaScript, Visual Basic, or another language, as desired. Document object model programs encoded using one of these languages may communicate with the SOAP receiver, for example, using Java programs, and may modify almost any aspect of a web page after it is loaded, without disrupting the page. Document object model programs operating within the various web pages may drive visual changes in concert with real-time SOAP transmissions, thereby updating the information displayed for the operator in real-time. They may also keep limited copies of the database information operating on the server and may present it to an operator on demand.

Figure 11:
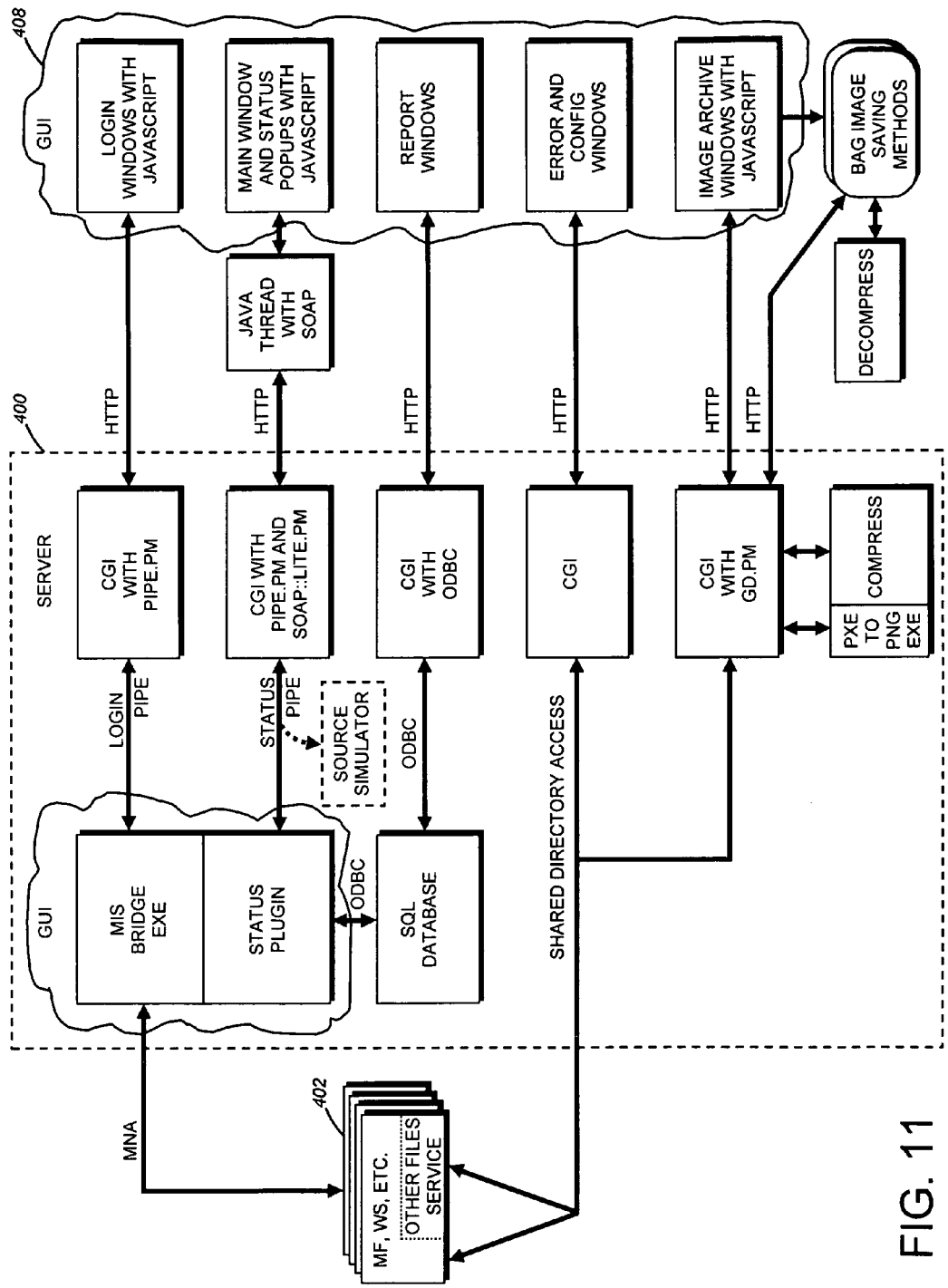
FIG. 11 is a flow diagram illustrating communication between various software processes of the system of FIG. 6.

Referring to FIG. 11, there is illustrated an example of information flow between the remote access server 400, a local network 402 of inspection machines, and a client browser 406. A serving engine, such as Apache, may provide the HTTP, HTTPS or other network protocol through which interactions with the client's browser occur, and under which the common gateway interface processes run. Referring again to FIG. 10, the remote access server contains software and/or hardware to run server processes 410, and transmits information to and receives information from the local network 402 and the client browser 406 by sending and receiving messages 414. The operator interface 406 may include one or more processors that may run a plurality of processes to display information received from the remote access server 400, and to relay information to the remote access server 400.

According to one embodiment, at the start of a client session, the remote access server 400 may produce a "blank canvas" for the session and send it to the operator interface 406. This blank canvas may contain all the object definitions and function programs, coded using Java and JavaScript for example, that may be needed during the client session. As soon as the blank canvas page has been sent to the operator interface (the client), the Java and JavaScript functions may begin their initialization process and the graphical display 408 of the operator interface may be populated with icons representing of all objects on the remote access server 400, as discussed above. The Java and JavaScript services are illustrated as processes 416 on the operator interface 406 in FIG. 10. The Java and JavaScript services wait for and handle information and control the state of objects on the client side. They may act to transmit information from the remote access server 400 to the client, and to transmit information from the client to the remote access server. They may act to request data from the remote access server, or notify the remote access server 400 of a change in status of a process. They may also receive and handle messages from the server and convert them to an updated display, for example, through the Document Object Model. The transmissions between the server and the client browser may be made using SOAP. Once the browser receives information from the server (via Java in a separate thread), it may make that information accessible to the JavaScript services that control the objects in the Document Object Model. The Java programs may operate in a separate software thread so that they are asynchronous to other operations on the browser.

Services on the client browser may operate to send information to and receive information from the graphical display. One or more of these services may be responsible for displaying HTML pages on the graphical display illustrating, for example, a graphical representation of bag rate versus time, and images of scanned bags. One or more of the services may be responsible for converting X-ray image files received from the remote access server in a proprietary format to a standard format for viewing in a browser, for example, JPEG, PNG, or some other format. This conversion may be implemented using, for example, a C++ program, or other suitable software. In order to speed up transfer of images from the network via the remote access server to the client browser, the images may be transmitted via the network protocol in a compressed (e.g. zip) format. In such cases, the client browser may include software to decompress (e.g. unzip) the images.

Figure 12:
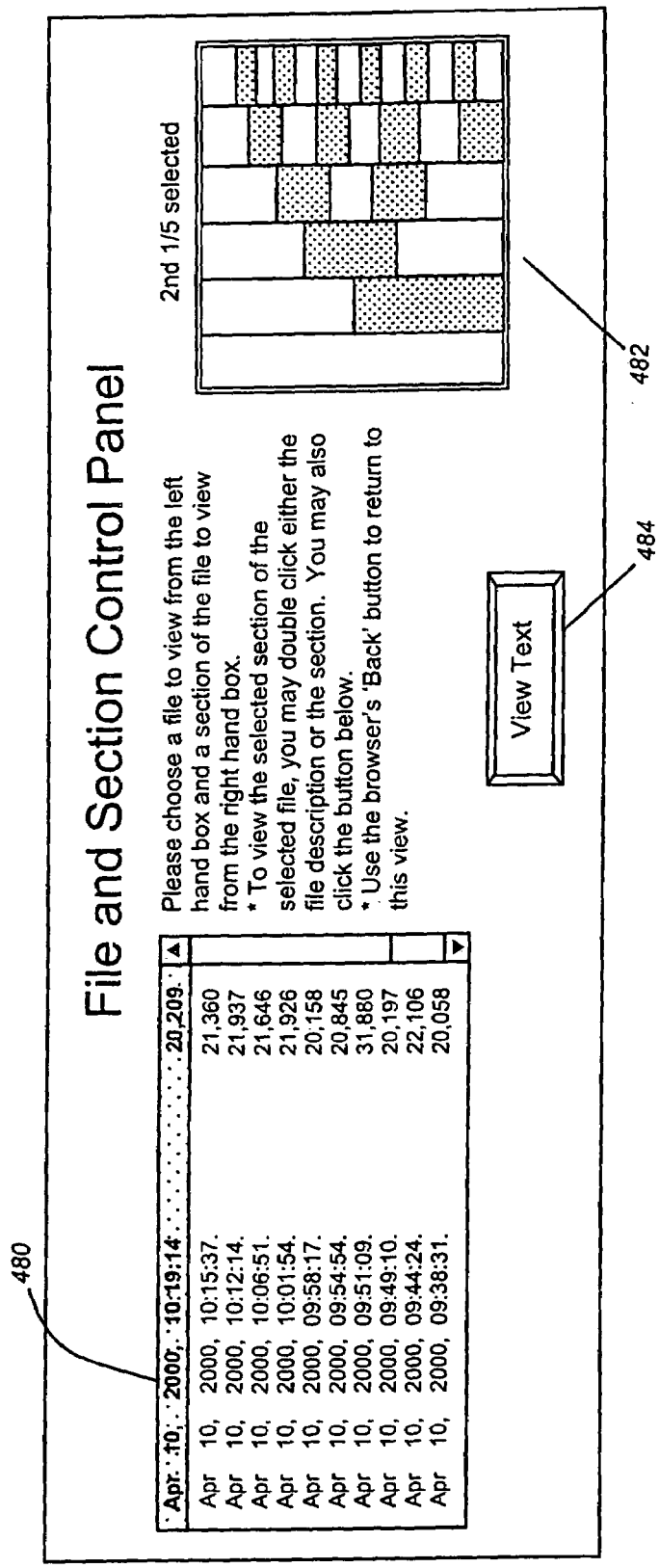
FIG. 12 is an exemplary file control panel that may be displayed on the operator interface of the system of FIG. 6.

According to another embodiment, software may be provided to allow an operator to select a section of a file (e.g. a report file or statistics file) that they wish to view rather than the whole file. This may allow a more effective use of the network bandwidth between the server and the client. To allow viewing of a desired section of a file, regardless of where it is within the file, the software may be encoded to use the Fibonacci sequence of numbers to divide the file, rather than binary numbers as are conventionally used. Division by Fibonacci numbers may be superior to division by binary numbers because successive section sizes in a Fibonacci scheme differ by a factor of 1.62 rather than a factor of 2 as in a binary scheme. Therefore, using a Fibonacci scheme provides more choices of file section sizes than does a binary scheme. Furthermore, the place at which a file is divided is not the same for two adjacent sizes, and it is thus more often possible to locate a section of the file that covers the area of interest because adjacent Fibonacci numbers always break the file at a different place. For example, using binary division, if the area of interest straddles the middle of the file, only viewing the entire file would show the whole area of interest, whereas with Fibonacci division, all sizes except 2 and 8 (corresponding to binary options) may produce a suitable section. FIG. 12 illustrates an exemplary file section control panel that may be displayed on the operator interface. The panel 480 on the left indicates files available for view and the size of each file. The control panel 482 on the left may indicate the possible sections of the file that may be selected—i.e., the file divided into a plurality of sections. A particular section of a file may be selected by selecting the appropriate file on the panel 480 and selecting the appropriate section on the control panel 482. Once the appropriate file and section is selected, clicking on the "view text" button 484 may cause the file section to be displayed on the operator interface for viewing by the operator.

Figure 13:
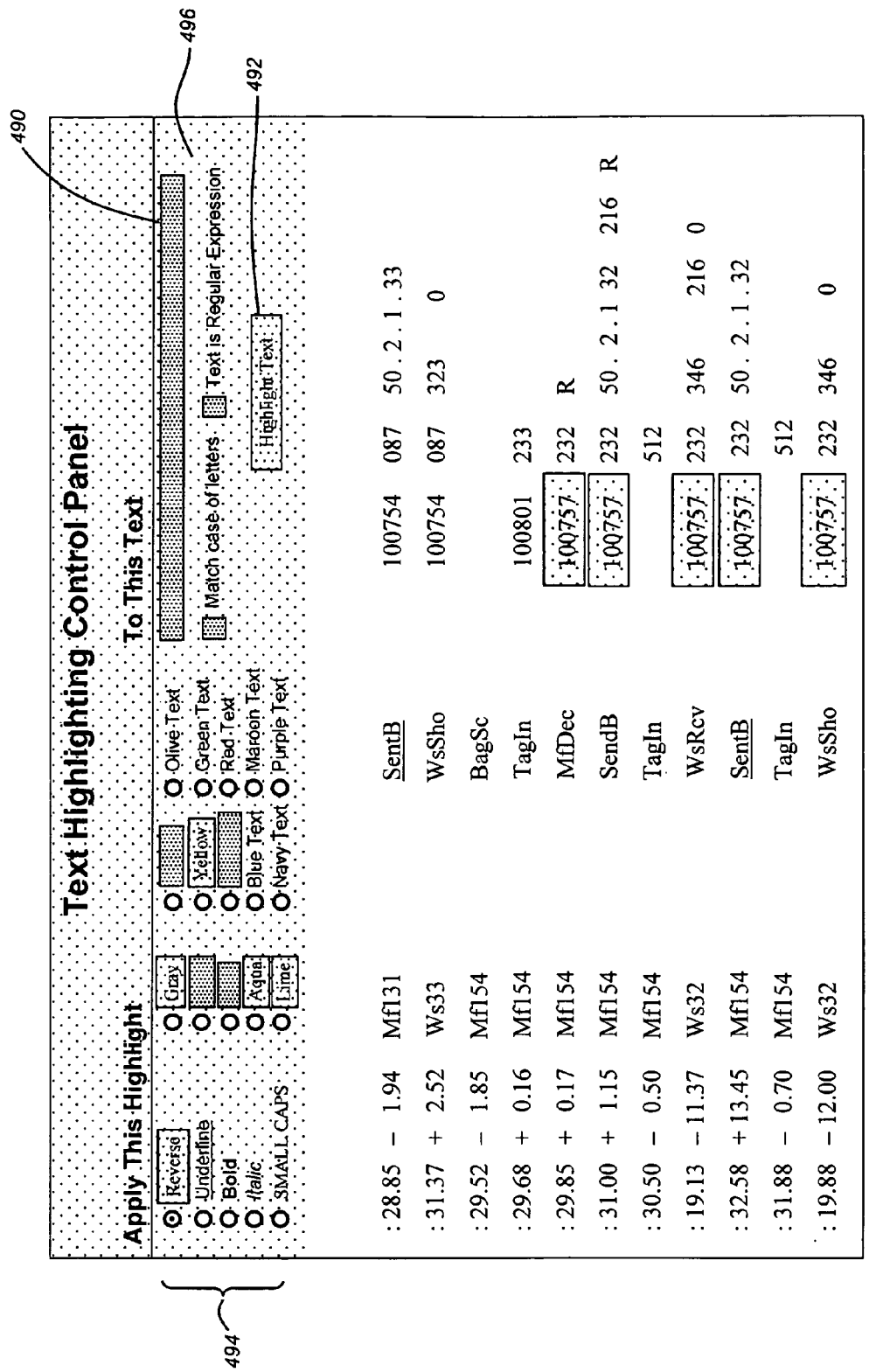
FIG. 13 is an text highlighting control panel that may be displayed on the operator interface of the system of FIG. 6.

According to another example, when a file, or section of a file, is displayed, an additional text control panel, illustrated in FIG. 13, may be available to allow an operator to find and mark interesting elements (for example, a particular item identifier) in the file. If text is entered in the edit box 490, clicking the "highlight text" button 492 may cause all matching instances in the file to be highlighted according to the set of radio buttons 494. The checkboxes 496 on the left may allow for the case of the text to be significant or not, and for the use of "regular expressions," which are those available in the programming language of the document object model programs.

Also included in the remote access server software may be algorithms for analyzing images obtained of items under inspection. Image analysis software (IAS), is software that may be used to automatically analyze X-ray image data using various algorithms for detection of target items or materials. The image analysis software may additionally process various images with a set of image processing algorithms that produce a better image for viewing by an operator. IAS may process stored image files of items, and may replicate the performance of an X-ray inspection machine screening real items. In one example, a single processor version of the image analysis software may be used to run a threat detection algorithm over a large set of stored bag image files and record the algorithm's decisions. IAS may be used to process large data sets quickly, and may produce a threat file for each bag image that is analyzed. This threat file may contain a threat polygon similar to information that is seen on the operator interface of a baggage inspection machine. IAS may be used to analyze image files obtained from a remote X-ray inspection system for contraband items such as currency, drugs or agricultural contraband. In another example, an X-ray image of an item under inspection may be stored in the database (412 FIG. 9), and may be associated with an item identifier with the X-ray image that links the X-ray image to the item under inspection. The X-ray image may be retrieved from the database by the remote access server in response to information provided about the item under inspection. The image analysis software may be used to analyze the X-ray image to locate a region of interest in the image, and may also perform further processing of the image to obtain information regarding the region of interest. Thus, IAS may be used to remotely screen items of baggage.

It is to be appreciated that the software implementing the above-described features may be provided on any type of computer-readable medium, and may be transmitted from one location to another via a carrier wave.

The remote access server may allow operators to access one or more networks of installed baggage screening machines from multiple locations. Many operators, with different types of access to the system, can be logged on at any time. The remote access server allows information collected by the machines of an installed network to be separated a great distance from an operator interface where the information may be displayed; the distance being any distance then available by any communication medium such as the Internet. The remote access server isolates the proprietary network of installed machines from the public Internet through a secure connection allowing operators to access the network in a controlled and secure fashion. Data structures may be used to mirror the state of the network of machines on the client browser, using, for example, JavaScript.

According to yet another embodiment, the remote access server may be used to implement methods of advance baggage screening that may expedite customs screening procedures at airports. According to the advance baggage screening (ABS) model of the present invention, a passenger's bag may be imaged once at the passenger's point of origin. The bag may be immediately screened for departure threats, such as explosives or weapons, and may be associated with a unique item identifier. In one example, screening of the item under inspection may produce an image file that may be associated with the unique item identifier to link the image file with the item under inspection. The image file, together with the unique item identifier, may be transmitted to an image processing center where software may be used to analyze the image file for contraband such as currency, drugs or agricultural contraband. The results of the analysis may be transmitted to a waiting customs official at a destination airport. Based on these results, the customs official at the destination airport may identify suspicious bags by the item identifier, and may send these bags to a second tier screening process. In one example, the system may use the passenger's point of origin for profiling, but is not dependent on other information regarding individual passengers. The advance baggage screening method disclosed herein may screen 100% of passengers, and not just those who match a high risk profile. The advance baggage screening model may require only one baggage inspection machine at the point of origin, by contrast with prior art systems in which machines were required at the point of origin and at the destination airport, and possibly also at any intermediary airports.

The ABS model of the present invention may include providing the information of threat detection without the encumbrance of selling a costly image machine. Although described here mostly in terms of an embodiment for airports, this system can be used for cargo as well as passengers, and can be used for all transportation methods, such as trains, boats, road vehicles, and the like.

The remote access server is one example of a means through which the ABS model can be implemented. The remote access server enables remote access to a network of inspection machines, allowing operators at any location to screen baggage at any other location. A business method according to the present invention contemplates a network of inspection systems that generate X-ray images of items under inspection. Each image may be associated with a corresponding item by a unique item identifier, which may include information regarding the item's point of origin and other information. The images and information may be stored on one or more central databases which may be accessed remotely by any number of authorized operators. Access to the images and information can be accomplished through the use of a web-based interface, as described above. The images may be processed using a number of threat detection algorithms.

Figure 14:
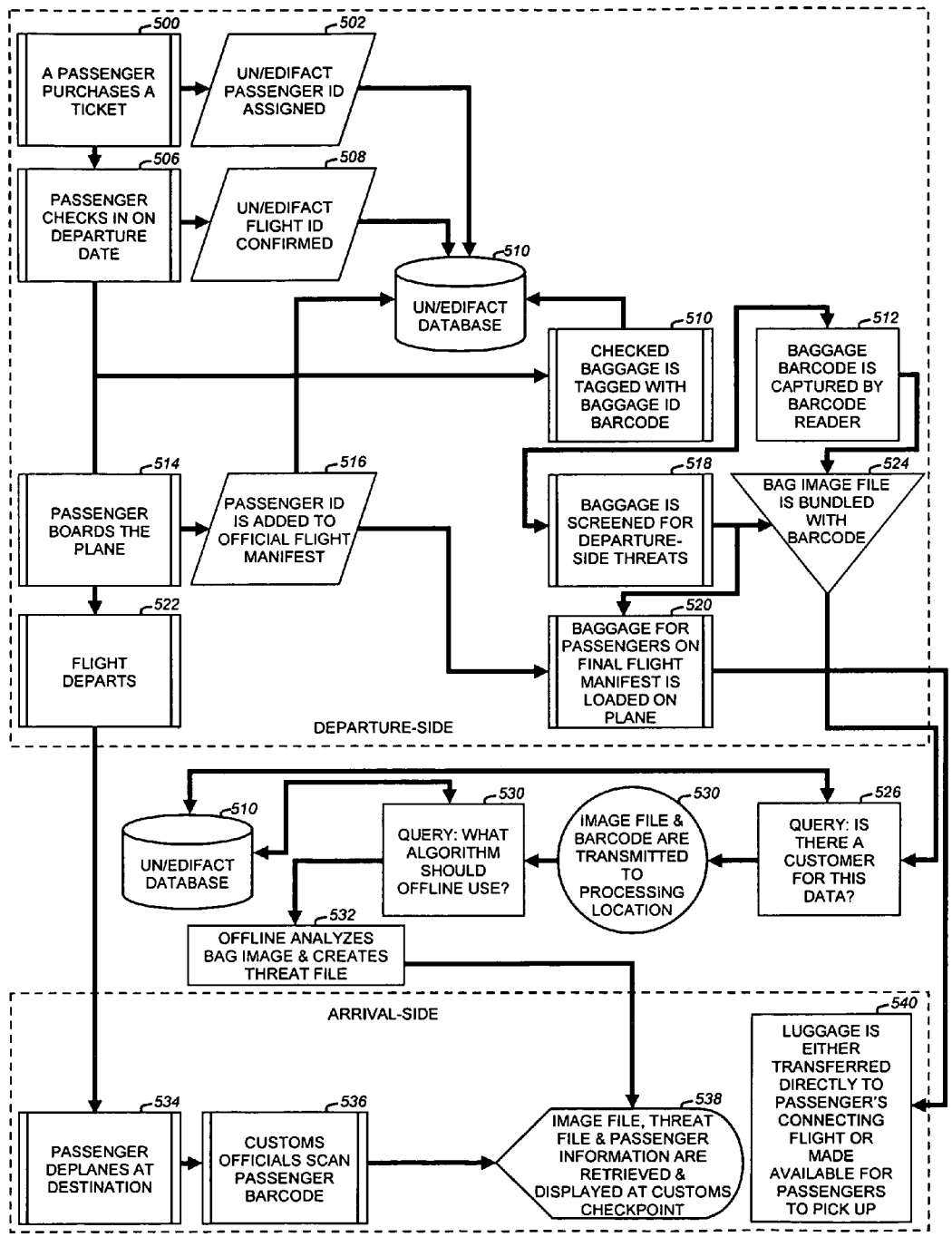
FIG. 14 is a flow diagram of one exemplary embodiment of a system and method of remote baggage screening according to the invention.

One exemplary embodiment of a system and method of advance baggage screening at an airport, using the remote access server described herein, is discussed in detail below with reference to FIG. 14. It is to be appreciated that the system and method of advance screening may follow a different procedure to that illustrated in FIG. 14, especially if the method is applied to cargo as opposed to passenger baggage.

In a first step 500, a passenger may purchases an airline ticket. Step 500 may be the point of entry for the passenger into the UN/EDIFACT system for passenger information. Although the illustrated outline of the system operation is based on the conventional UN/EDIFACT database, the system may use any type of passenger information database.

In a second step 502, a UN/EDIFACT passenger identifier is assigned to the passenger. In addition, other information about the passenger may be entered into the database, such as, for example, the passenger's country of origin, the location where the ticket was purchased, whether the passenger paid for the ticket with cash, etc. The passenger identifier may include a unique record identifier that may be used to reference all other pieces of information related to the passenger. The remote access server system of the invention may include all of the passenger information that the system may be allowed to access according to government or airline regulations. For example, as well as X-ray or other data relating to the item under inspection, the system may also access, for example, a digital photograph of the passenger or passenger's passport, and other information which may have been obtained at some point during the passenger's check-in procedure. Thus, a final display of an image of the passenger's bag for customs may include a text message including all or part of the passenger information found among several related databases, UN/EDIFACT or others. Additionally, the algorithm later used to screen the passenger's bag may be tailored to the information found in the passenger records. There are social and political pressures to reduce racial and ethnic profiling of passengers. The present system will make it possible to use other data to select the appropriate algorithm. The UN/EDIFACT database 504 refers to the set of related databases that relate to passengers to their baggage and flight. The database 504 may be any database of passenger information that links the passenger to their baggage In a third step 506, the passenger checks in at the airport on the departure date At this point, the passenger is typically "confirmed" for the particular flight that he or she booked a ticket on. As a matter of security, bags will not be loaded onto a plane if the passenger has not confirmed his or her reservation on that flight. This is followed by step 508 of confirming the UN/EDIFACT flight identifier for the passenger. When the passenger checks in with or without baggage, additional information may be added to the overall database of passenger/flight information. Next, a step 510 of tagging checked baggage with a baggage identifier barcode may be performed. Conventionally, this tag contains a text message indicating the passenger's destination and a barcode that contains the passenger identifier number. It is to be appreciated that although the step 510 is described herein as tagging the baggage with a barcode, the system and method are not so limited. For example, the baggage may be tagged with an RF transponder encoded with a unique item identifier. The use of an RF transponder bag tag may significantly improve the performance of the system by improving the accuracy and speed of bag tag reading by electronic means. The bag tag may be manually or automatically entered into the database used by the remote access server system.

In a next step 512, the baggage barcode may be captured by barcode reader, and stored so that it may be related to the image that is produced by an inspection machine that examines the bag. In one example, a barcode reader is placed in relationship to the X-ray imaging device such that the X-ray system (or a system on the network of X-ray systems) may bundle the image file with some identifying number that will relate the bag to the passenger. Again, it is to be appreciated that this step does not have to include a barcode read by a barcode reader, but could refer to an RF tag being read into the system or the manual entry of some bag identifier.

In step 514 the passenger may board the plane. At this point, the passenger's boarding pass may be read electronically, and in step 516 the passenger's identifier may be added to an official flight manifest. If a passenger who has checked in does not physically board the plane, his or her baggage will be removed from the plan for security reasons. In one example, a passenger may be directly related to a specific flight in a database. However, the system may operate wherever the passenger can be related to their baggage—flight information may be helpful, but not necessarily required. Flight information may provide a way to select the bag images and security information of interest to the arrival-side authorities at a particular destination. However, the system may operate with an identifier that links the bag to the passenger without flight information. The arrival-side authorities may use the passenger identifier to pull the bag image and other related information from a very large database of all captured images. In one example, the bag image may be tied directly to the flight manifest. Sending the bag image with the flight manifest may be one way to communicate the bag image data.

In step 518 the baggage may be screened for departure-side threats and other targets. For example, the departure side airport may screen for explosives and contraband. At this step in the process departure-side information about the bag is produced. The departure-side information may include an X-ray image of the baggage, and the data for that image may be what will be sent for reprocessing for arrival-side authorities. The "imaging" of the bag does not necessarily have to be an X-ray image that is reprocessed. The bag image may be a CT image that is simply re-displayed for human operators on the arrival side. A plurality of departure-side security screening techniques may be used as the source of bag data that is communicated from the departure-side to the arrival-side, whether reprocessed or not.

In steps 520 and 522 baggage for passengers on final manifest may be loaded on plane and the flight may depart. These steps are included to describe the physical location of the baggage at the end of the passenger departure process.

At some point, the image of the bag has to be related to the passenger. This occurs at step 524 where the bag image file is bundled with the barcode. Bundling refers to adding the barcode to the bag image file. There are many ways that this could be done, through database links, the time the image is acquired, etc. What is important is that the bag image data and the bag or passenger identifier are linked in some way. This linkage is the means by which the bags will be properly identified by the arrival-side authorities, either directly or through a relational database (e.g., from the flight manifest to the passenger identifier to the bag tag number).

While the passenger is in flight, the remote access server and image analysis software may be used by arrival-side authorities to remotely screen the images of the bags obtained by the departure-side authorities. For example, the remote access server, or an operator located at the remote operator interface may query a database to see if there is a customer for the information—step 526. At a minimum, this database may include a list of destination airports. This database may also include information about what algorithms the customers may wish to use and other customizable settings. This step may include some means of communicating from the departure-side to the arrival-side that data of interest exists. In one example, a departure-side airport may be able to restrict access to arrival-side authorities that it approves of. An airport authority might wish to allow some no access, some access to the bag data only, some access to the image only (e.g., a bit-map of the real X-ray data), and some access to both the bag/image and the threat information (the results of the departure-side algorithmic processing of the bag). Additionally, a digital signature system may be employed to verify that the image data and bag identifier are related and have not been tampered with since the bag system acquired the bag image data.

Once it has been determined that an arrival-side airport requires (and is permitted access to) the data stored in the database, the image file and barcode may be transmitted to a processing location, as shown by step. The processing location may be an arrival-side airport or may be some other remote location. In one example, the bag image data and the identification linking it back to the passenger may be reprocessed for the arrival-side authorities. However, reprocessing is not required. An arrival-side authority might wish only to view the bag data/image, or they may wish to see the bag data and the results of the algorithmic processing of the bag from the departure-side algorithm.

Step 530 includes selecting a detection algorithm with which to analyze the bag image. If the arrival-side authority wished to reprocess the bag image data, the particular algorithm may be tailored for their specific needs. If the bag images go to an intermediary location for reprocessing, some database linking the arrival-side authority to the appropriate algorithm(s) may be used to select the algorithm. A customer may choose to process each bag depending on the point of origin of the passenger. If so, the passenger identifier may be used to reference the passenger information (typically through the UN/EDIFACT system) to determine the passenger's point of origin. Other passenger information may also be used to select the algorithm used to reprocess the bag. The arrival-side authority could use any standard database query (e.g., a SQL expression) to determine which algorithm is used to reprocess a bag.

In step 532 image analysis software may be used to analyze bag images and creates a threat file for each bag. If reprocessing is chosen, some software may be used to re-analyze the bag, using the selected algorithm or another method of processing. The output of such processing may be a threat information file, containing the algorithm results, such as, for example, an outline of the threat found and other information about the threat. Further processing may be included to improve the appearance of the image for easier detection of contraband by arrival-side operators. In this case, the result of this processing may include a processed image, not a threat file.

In a next step 534 the passenger may deplane at the destination. This step represents "arrival" in its many forms. In the particular example given, the passenger deplanes. In other situations, this step may represent a flight making a connection where the passenger does not deplane. In one example, the passenger may arrive at a Customs inspection station, and a Customs official may enter the passenger identifier into the remote access server, via, for example, an operator interface—step 536. This may also include scanning the barcode attached to the passenger's bag As mentioned above, this passenger identifier does not need to be a barcode, and may be any unique identifier that ties the passenger to their baggage.

The image file, threat file & passenger information may be retrieved by the remote access server and displayed at Customs checkpoint—step 538. Whether the passenger is present or still on the plane (in the case of connecting flight), at some point the image (or some "go", "no go" result provided by a detection algorithm or an operator) may be displayed for the arrival-side authority at their inspection point. In one example, the image may be displayed twice, once to an operator who inspects the image for contraband, for example, while the flight is in the air on the way to the arrival-side authority, and a second time, along with the operator's result when the passenger arrives at the inspection point.

Finally, in step 540, baggage may be either transferred directly to passenger's connecting flight, or made available for passengers to pick up. The disposition of the luggage may be automated based on the detection algorithm or operator results. If a bag has not passed, the baggage handling personnel may locate the bag on an airplane based on the baggage identifier. Bags on a connecting flight which have not passed inspection can be removed individually for further inspection. Furthermore, passengers whose luggage has not passed inspection may be individually asked to deplane. Bags which have passed inspection may be passed along to their next connecting flight.

The remote access server facilitates customer service via the ability to cause a change in state of a baggage screening machine through remote access to and operation on a network. Customer service representatives may run remote diagnostics through the server. The remote access server may provide a platform for developing and deploying new service applications in the future. The remote access server may make both the system state and system data available, and allow both states of machines to be controlled and data constantly monitored without effecting the performance of a baggage screening network.

Further, the remote access server facilitates the use of automated means of optimizing the operation of a baggage screening system. The server allows operations personnel access to information relating to manpower, system throughput, etc. The remote access server allows operations personnel access to this data in an electronic format that can be directly imported into any number of analysis, data-mining, or operations automation software programs.

It is to be appreciated that the system and methods disclosed herein may be useful in many different applications and are not limited to the specific applications described herein. For example, the system and methods may be applied to baggage screening for domestic as well as international flights, to cargo as well as baggage, or to packages or any other items being transported from one location to another. The system and methods may also be applied to non-destructive testing of components during manufacturing. In one example, an inspection machine may be used to obtain an X-ray image of a component, and the component may include a unique identifier used to link the component to the X-ray image. An remote operator may examine the image, or an algorithm may be implemented to examine the image, to detect whether the component has any defects. A remote access server may be used to control information transfer in this application as was described above in reference to the baggage screening applications.

Furthermore, it is to be appreciated that embodiments and aspects of the invention may be executed on any suitable processor, such as processors within one or more computer systems, or a dedicated processor. Any single component or a collection of multiple components of the computer environment that perform any of the functions described above can generally be considered as one or more controllers that may form part of the remote access server and the operator interface. It is further to be appreciated that embodiments of the invention include a computer readable medium (or multiple computer readable media), such as, but not limited to, a computer memory, one or more floppy disks, compact disks, optical disks or magnetic tapes. The computer readable medium may be encoded with one or more computer programs that when executed on one or more computers or other processors, performs methods that implement the various embodiments and aspects of the invention discussed above. The computer readable medium may be transportable, such that the programs stored thereon may be loaded onto one or more computer systems, and may be distributed across a network, to implement various aspects of the invention as discussed above. Additionally, the one or more computer programs that when executed perform methods of the present invention need not reside on a single computer or processor, but may be distributed in a modular fashion amongst a number of different computers or processors.

Having thus described various illustrative, non-limiting embodiments and aspects thereof, modifications and alterations will be apparent to those of skill in the art. Such modifications and alterations are intended to be included in this disclosure, which is for the purpose of illustration and explanation and not intended to define the limits of the invention. The scope of the invention should be determined from proper construction of the appended claims, and their equivalents.

What is claimed is:

1. A method of performing multiple inspections of an object, the method comprising acts of:
    using an X-ray scanning device to perform an X-ray scan of the object to generate scan data representative of the object;
    analyzing the scan data at a first airport to determine whether the object contains any subject matter prohibited from being loaded onto an airplane;
    transmitting the scan data over a communication medium to a second airport; and
    analyzing the scan data at the second airport to determine whether the object is permitted to proceed beyond a checkpoint at the second airport.

2. The method of claim 1, wherein the object is baggage, the first airport is a departure-side airport and the second airport is an arrival-side airport, and wherein the acts of:
    analyzing the scan data at the first airport includes an act of analyzing the scan data to determine whether the baggage contains any threat material; and
    analyzing the scan data at the second airport includes an act of analyzing the scan data to determine whether the baggage contains any contraband.

3. The method of claim 1, wherein the object is baggage and wherein the method further comprises an act of linking identification information to the scan data to form an object file, the identification information including at least a unique identifier to uniquely associate the object file with the object.

4. The method of claim 3, wherein the act of analyzing the scan data at a first airport includes an act of analyzing the scan data at a central processing area located remotely from the X-ray scanning device, the central processing area including at least one first computer connected to the X-ray scanning device over a network to receive the scan data.

5. The method of claim 4, wherein the act of analyzing the scan data at the central processing area includes an act of using the at least one first computer to process the scan data by implementing at least one first detection algorithm configured to automatically determine whether any portion of the scan data is likely associated with subject matter within the baggage prohibited from being loaded onto the airplane.

6. The method of claim 5, further comprising an act of transmitting the scan data and a threat file to a first operator interface for inspection by a first operator when the at least one first computer automatically determines that an identified portion of the scan data is likely associated with subject matter within the baggage prohibited from being loaded onto the airplane, the threat file generated by the at least one first computer to indicate the identified portion to facilitate the first operator in determining whether the baggage is permitted to be loaded onto the airplane.

7. The method of claim 5, wherein the second airport includes at least one second computer coupled to the at least one first computer via the network, and wherein the acts of:
    transmitting the scan data includes an act of transmitting the object tile to the at least one second computer via the network; and
    analyzing the scan data at the second airport includes an act of using the at least one second computer to process the scan data by implementing at least one second detection algorithm configured to automatically determine whether any portion of the scan data is likely associated with subject matter within the baggage prohibited from proceeding beyond the checkpoint at the second airport.

8. The method of claim 7, wherein the identification information further comprises passenger information, and wherein the method further comprises an act of transmitting the object file to a second operator interface for inspection by a second operator when the at least one second computer automatically determines that an identified portion of the scan data is likely associated with subject matter within the baggage prohibited from proceeding beyond the checkpoint at the second airport, the at least one second computer providing a threat file with the object file to indicate the identified portion to facilitate the second operator in determining whether the object is permitted to clear Customs.

9. The method of claim 1, wherein the act of using an X-ray scanning device includes an act of using an X-ray scanning device that has a pre-scanning component comprising a line scanner and a post-scanning component comprising a computed tomography (CT) scanner.

10. An inspection system for providing multiple inspections of an object, the inspection system comprising:
 a network;
 an X-ray scanning device coupled to the network, the X-ray scanning device adapted to perform an X-ray scan of the object to generate scan data representative of the object;
 a first computer to receive the scan data generated by the X-ray scanning device, the first computer adapted to facilitate analysis of the scan data at a first inspection area located in a first airport to determine whether the object contains any subject matter prohibited from being loaded onto an airplane; and
 a second computer coupled to the network to receive the scan data generated by the X-ray scanning device, the second computer adapted to facilitate analysis of the scan data at a second inspection area located in a second airport to determine whether the object is permitted to proceed beyond a checkpoint at the second airport.

11. The inspection system of claim 10, wherein the object is baggage, the first airport is a departure-side airport and the first inspection area is used to determine whether the baggage contains any threat material, and wherein the second airport is an arrival-side airport and the second inspection area is used to determine whether the baggage contains any contraband.

12. The inspection system of claim 11, further comprising a server coupled to the network, the server provided to store the scan data and identification information linked to the scan data to form an object file, the identification information including at least a unique identifier that uniquely associates the object with the scan data.

13. The inspection system of claim 12, wherein the first computer is coupled to the network and obtains the scan data from the server via the network, and wherein the first computer implements at least one first detection algorithm configured to automatically determine whether any portion of the scan data is likely associated with subject matter within the baggage prohibited from being loaded onto the airplane.

14. The inspection system of claim 13, wherein the first computer is further adapted to provide the scan data and a threat file to a first operator interface for inspection by a first operator when the first computer automatically determines that an identified portion of the scan data is likely associated with subject matter within the baggage prohibited from being loaded onto the airplane, the threat file generated by the first computer to indicate the identified portion to facilitate the first operator in determining whether the baggage is permitted to be loaded onto the airplane.

15. The inspection system of claim 14, wherein the second computer obtains the object file from the server via the network, and wherein the second computer implements at least one second detection algorithm configured to automatically determine whether any portion of the scan data is likely associated with contraband within the baggage.

16. The inspection system of claim 15, wherein the identification information further comprises passenger information, and wherein the second computer is part of a Custom's checkpoint and is adapted to provide the object file to a second operator interface for inspection by a second operator when the second computer automatically determines that an identified portion of the scan data is likely associated with contraband within the baggage, the second computer providing a threat file with the object file that indicates the identified portion to facilitate the second operator in determining whether the baggage is permitted to clear Customs.

* * * * *

UNITED STATES PATENT AND TRADEMARK OFFICE
CERTIFICATE OF CORRECTION

PATENT NO.        : 7,139,406 B2                                        Page 1 of 1
APPLICATION NO. : 10/116693
DATED             : November 21, 2006
INVENTOR(S)       : McClelland et al.

It is certified that error appears in the above-identified patent and that said Letters Patent is hereby corrected as shown below:

In the Claims:

In claim 7, line 61, please replace "the object tile" with -- the object file --;

Signed and Sealed this

Sixth Day of March, 2007

JON W. DUDAS
*Director of the United States Patent and Trademark Office*